US011698256B2

(12) United States Patent
Blomqvist et al.

(10) Patent No.: US 11,698,256 B2
(45) Date of Patent: Jul. 11, 2023

(54) GYROSCOPE WITH PERIPHERAL DETECTION

(71) Applicant: MURATA MANUFACTURING CO., LTD., Nagaokakyo (JP)

(72) Inventors: Anssi Blomqvist, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 23 days.

(21) Appl. No.: 17/241,650

(22) Filed: Apr. 27, 2021

(65) Prior Publication Data

US 2021/0364291 A1    Nov. 25, 2021

(30) Foreign Application Priority Data

May 25, 2020    (FI) ...................................... 20205525

(51) Int. Cl.
*G01C 19/5747*    (2012.01)
*G01C 19/5712*    (2012.01)

(52) U.S. Cl.
CPC ..... *G01C 19/5712* (2013.01); *G01C 19/5747* (2013.01)

(58) Field of Classification Search
CPC ............ G01C 19/5712; G01C 19/5747; G01C 19/5621
See application file for complete search history.

(56) References Cited

U.S. PATENT DOCUMENTS

| 11,460,301 | B2* | 10/2022 | Geisberger | G01C 19/5747 |
| 2005/0050954 | A1 | 3/2005 | Chaumet et al. | |
| 2015/0211854 | A1 | 7/2015 | Ruohio et al. | |
| 2016/0370180 | A1* | 12/2016 | Naumann | G01C 19/5614 |
| 2017/0234684 | A1 | 8/2017 | Coronato et al. | |
| 2018/0172446 | A1 | 6/2018 | Prikhodko et al. | |

(Continued)

FOREIGN PATENT DOCUMENTS

JP    2012-145493 A    8/2012

OTHER PUBLICATIONS

Office Action dated Jun. 13, 2022, corresponding to Japanese Patent Application No. 2021-075412.

(Continued)

*Primary Examiner* — Jill E Culler
*Assistant Examiner* — Ruben C Parco, Jr.
(74) *Attorney, Agent, or Firm* — Squire Patton Boggs (US) LLP

(57) ABSTRACT

A gyroscope comprises four Coriolis masses arranged around a center point where a lateral axis crosses a transversal axis orthogonally in the device plane. The first and second masses are aligned on the lateral axis, and the third and fourth masses are aligned on the transversal axis. The gyroscope further comprises four pairs of elongated mass elements. The mass elements of the first pair are transversally aligned on opposite sides of the lateral axis outside of the first mass. The mass elements of the second pair are transversally aligned on opposite sides of the lateral axis outside of the second mass. The mass elements of the third pair are laterally aligned on opposite sides of the first transversal axis outside of the third mass. The mass elements of the fourth pair are laterally aligned on opposite sides of the first transversal axis outside of the fourth mass.

6 Claims, 14 Drawing Sheets

(56) References Cited

U.S. PATENT DOCUMENTS

2018/0172447 A1    6/2018  Prikhodko et al.
2019/0120625 A1*  4/2019  Lo .......................... B81B 3/0059
2021/0364293 A1* 11/2021  Blomqvist ......... G01C 19/5747

OTHER PUBLICATIONS

Finnish Search Report dated Jan. 25, 2021 corresponding to Finnish Patent Application No. 20205525.

European Search Report dated Oct. 8, 2021 corresponding to European Application No. 21170661.

Bin Zhou et al., "Innovation of Flat Gyro: Center Support Quadruple Mass Gyroscope," 2016 IEEE International Symposium on Inertial Sensors and Systems, IEEE, Feb. 22, 2016, pp. 42-45, XP032883647.

* cited by examiner

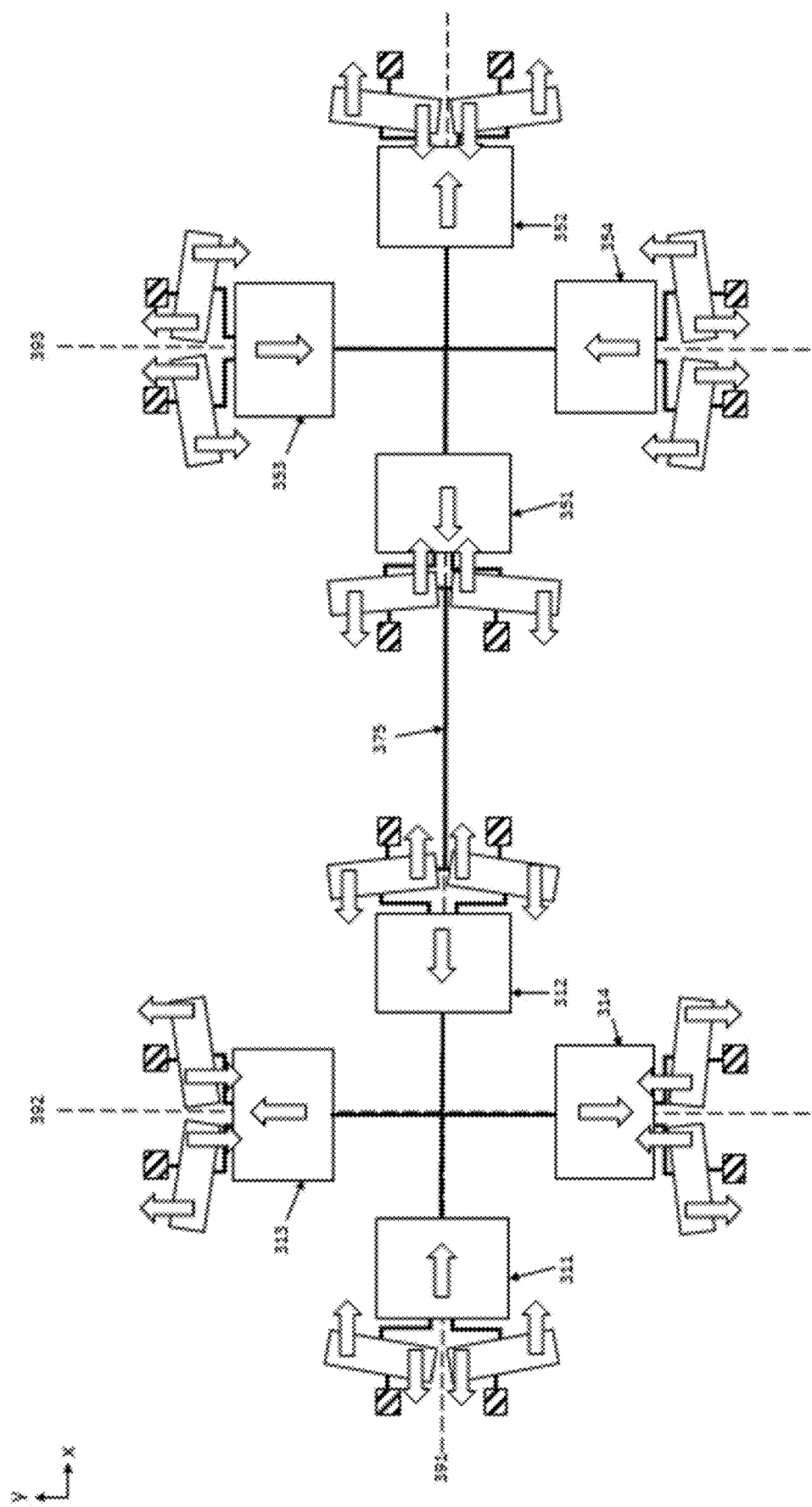

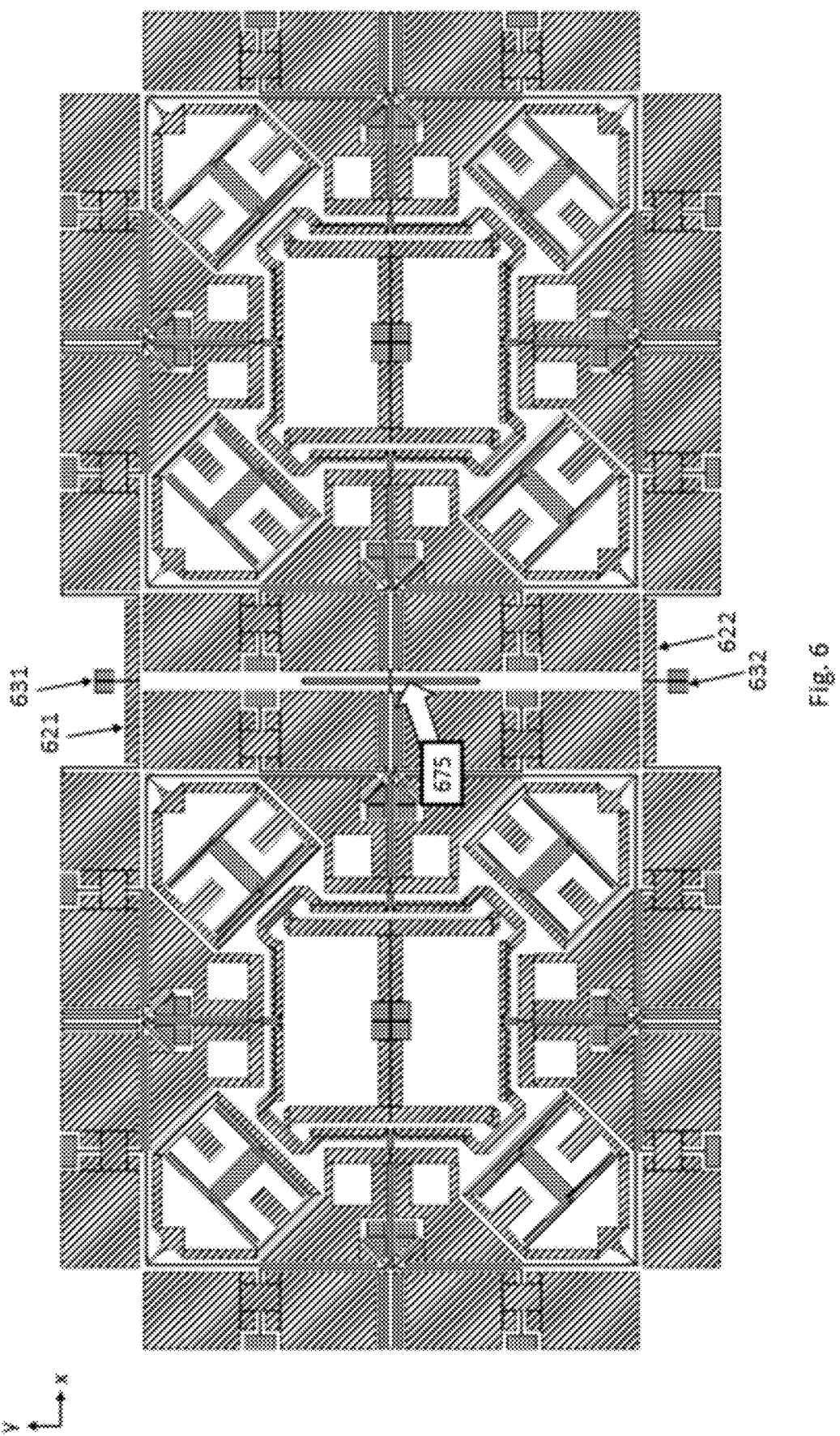

GYROSCOPE WITH PERIPHERAL DETECTION

FIELD OF THE DISCLOSURE

This disclosure relates to microelectromechanical gyroscopes, and more particularly to gyroscopes where an oscillating proof mass system is used to measure angular rotation at least about one rotation axis which lies in the device plane.

BACKGROUND OF THE DISCLOSURE

In microelectromechanical (MEMS) gyroscopes proof masses should preferably be easily set to oscillate in a primary oscillation mode (which may also be called the drive oscillation mode) and also easily undergo oscillation in a secondary oscillation mode (which may also be called the sense oscillation mode) induced by the Coriolis force. A general problem in gyroscope is that the oscillation of the proof masses in these two modes should preferably not be perturbed by external disturbances, for example vibrations in surrounding elements. A gyroscope should preferably be unperturbed by both linear and rotational vibrations so that its output signal is determined only by the angular rotation rate which the gyroscope undergoes in the intended frequency range. In automotive applications, for example, potential disturbances typically lie in the frequency range 0-50 kHz, while the input frequency range typically lies below 1 kHz.

A simple MEMS gyroscope may be constructed utilizing only one oscillating proof mass, but the output signal of such a gyroscope will typically be very noisy when external vibrations are present at frequencies close to the operating frequency. One-mass gyroscopes would be practical only at operating frequencies above 50 kHz, but in these frequencies the sensitivity of the gyroscope may be very low and other disturbing effects, such as quadrature signals arising from manufacturing imperfections, often become very prominent. Also, the unbalanced drive mode of the single mass drive causes energy leakage from the drive mode due to reaction forces of the drive oscillation. This will induce all kinds of issues; increase drive force needed for operation, stability issues and requirement for hard die attachment etc.

It is known that a proof mass system where two or four proof masses oscillate in anti-phase can be made much more robust against vibrations than a one-mass gyroscope.

Signal components arising from vibrations that induce cophasal movement of the two or four proof masses can to some degree be automatically cancelled via differential measurements. Furthermore, if the cophasal resonant frequency can be brought above 50 kHz without affecting the differential resonant frequency, the disturbing vibrations will typically produce no resonance amplification.

Some MEMS gyroscopes are designed for measuring rotation rate about one axis which is perpendicular to the device substrate. Such gyroscopes may be called z-axis gyroscopes. Other MEMS gyroscopes are designed for measuring rotation rate about either of the two perpendicular axes that lie within the substrate plane. Such gyroscopes may be called x-axis gyroscopes and/or y-axis gyroscopes. Multiaxis MEMS gyroscopes are designed for measuring rotation rate about the x-, y-, and/or z-axis with the same set of oscillating proof masses.

Document US2017234684 discloses a gyroscope with multiple mass elements nested together with a complicated system of connecting elements.

BRIEF DESCRIPTION OF THE DISCLOSURE

An object of the present disclosure is to provide a simple but robust gyroscope structure. The object of the disclosure is achieved by an arrangement which is characterized by what is stated in the independent claims. The preferred embodiments of the disclosure are disclosed in the dependent claims.

The disclosure is based on the idea of centering a quartet of Coriolis masses around a quartet center point and coupling a pair of elongated mass elements to each Coriolis mass close to the periphery of said quartet. With suitable coupling some secondary oscillation modes can be detected from the movement of these elongated mass elements while other secondary oscillation modes can be detected from the movement of the Coriolis mass quartet.

BRIEF DESCRIPTION OF THE DRAWINGS

In the following the disclosure will be described in greater detail by means of preferred embodiments with reference to the accompanying drawings, in which

FIGS. 3b–3c illustrate two alternative primary oscillation modes.

FIG. 6 illustrates a third practical example.

DETAILED DESCRIPTION OF THE DISCLOSURE

Figures 1, 2A:
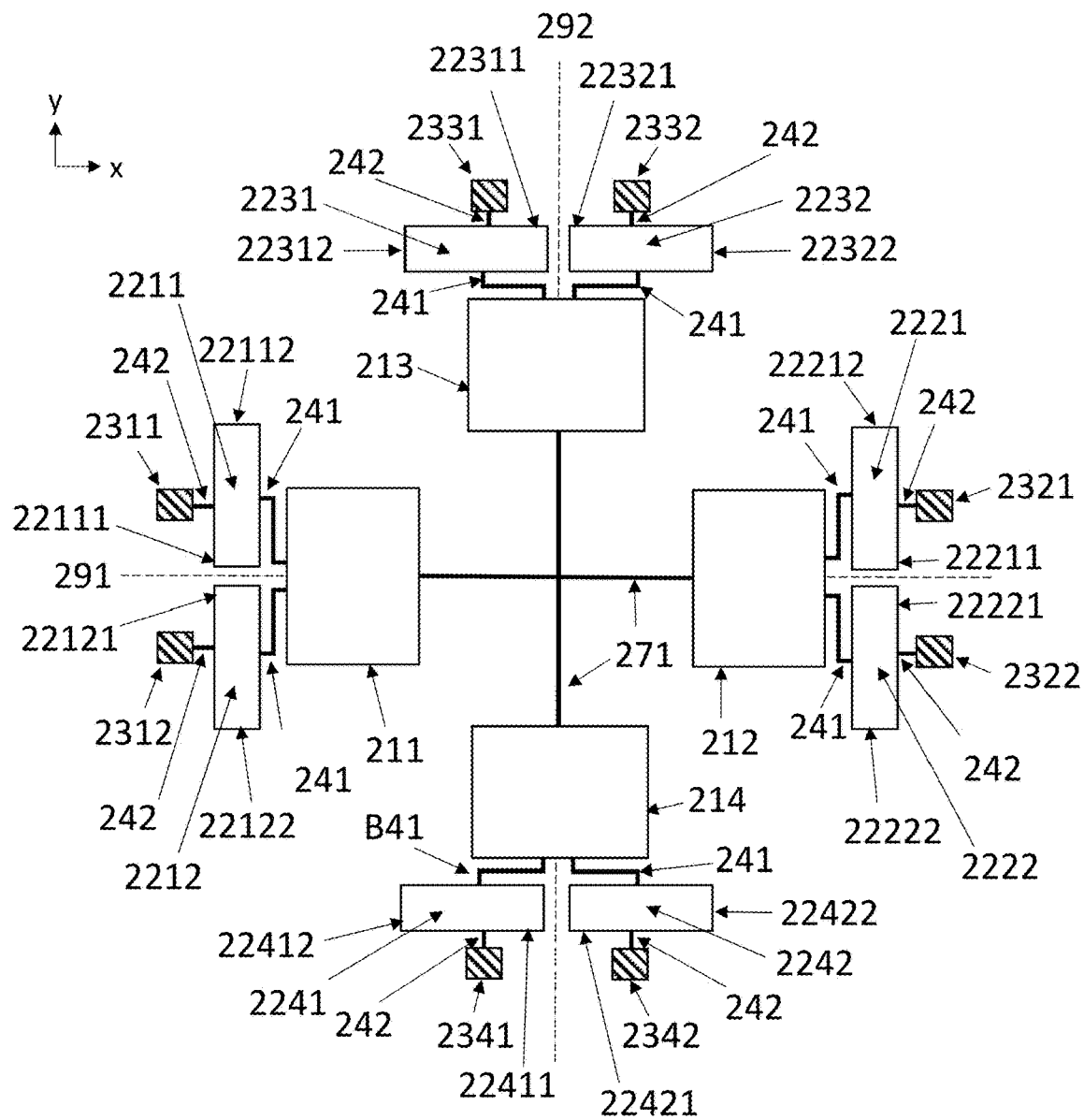
FIG. 1 illustrates the symbols which denote the primary and secondary oscillation modes in this disclosure.
FIG. 2a illustrates a gyroscope according to a first embodiment.

This disclosure describes a microelectromechanical gyroscope which comprises a first Coriolis mass quartet which in its rest position lies in a device plane and a corresponding first quartet center point which lies on a first lateral axis in the device plane.

The first Coriolis mass quartet comprises four Coriolis masses which are in their rest positions symmetrically arranged around the first quartet center point where the first lateral axis crosses a first transversal axis orthogonally in the device plane. The first and second Coriolis masses in the first Coriolis mass quartet are aligned on the first lateral axis in their rest position, and the third and fourth Coriolis masses in the first Coriolis mass quartet are aligned on the first transversal axis in their rest position.

The gyroscope further comprises a first central synchronization arrangement centred around the first quartet center point inside the first Coriolis mass quartet.

The gyroscope further comprises a first, second, third and fourth pair of elongated mass elements. The elongated mass elements which form the first pair are transversally aligned on opposite sides of the first lateral axis outside of the first Coriolis mass. The elongated mass elements which form the second pair are transversally aligned on opposite sides of the first lateral axis outside of the second Coriolis mass. The elongated mass elements which form the third pair are laterally aligned on opposite sides of the first transversal axis outside of the third Coriolis mass. The elongated mass elements which form the fourth pair are laterally aligned on opposite sides of the first transversal axis outside of the fourth Coriolis mass.

Each elongated mass element in the first, second, third and fourth pairs of elongated mass elements is suspended from a corresponding first peripheral anchor point by a first mass element suspender. Said first mass element suspender extends from said first peripheral anchor point to a fixing point located substantially at the midpoint of said mass element. Each elongated mass element in the first, second, third and fourth pairs of elongated mass elements is attached to the corresponding Coriolis mass with a connecting spring arrangement.

The gyroscope may optionally comprise a central anchor point located at each quartet center point, or multiple central anchor points placed symmetrically around each quartet center point, for example on diagonal axes which cross the center point. The gyroscope may also comprise a central suspension arrangement which suspends each Coriolis mass quartet from the corresponding one or more central anchor points. The central suspension arrangement thereby provides structural support to the Coriolis mass quartet and the central suspension arrangement may comprise the central synchronization arrangement which synchronizes the oscillation of the Coriolis mass quartet in the primary oscillation mode. The practical examples given in this disclosure illustrate central suspension arrangement which include a central synchronization arrangement.

However, in some cases the Coriolis mass quartet may be suspended from peripheral anchor points, or from anchor points located within an opening formed in said Coriolis mass. The Coriolis masses may then obtain sufficient structural support from these anchor points, and no central suspension arrangement may be needed. In such cases the central synchronization arrangement may perform a synchronization function without providing structural support.

Each elongated mass element has a longer dimension and a shorter dimension in the device plane. The direction in which the longer dimension extends may be called the longitudinal direction of said elongated mass element. In this disclosure, the expression "laterally aligned" means that the two elongated mass elements which form the pair of elongated mass elements are arranged end-to-end so that the longitudinal directions of both elongated mass elements substantially coincide and that these longitudinal directions are lateral. The expression "transversally aligned" refers to the same end-to-end alignment where the longitudinal directions of a pair are transversal. The two elongated mass elements which form a pair are separate from each other, but the connecting spring arrangement may in some cases be placed between them and attached to both of them, as described in more detail below.

The expressions "aligned on the lateral/transversal axis", refer to the placement of Coriolis masses so that the said axis substantially crosses the midpoint of said Coriolis mass. The Coriolis mass may be symmetric in relation to said axes and/or the axis may cross the center of gravity of said Coriolis mass.

The surface area of each Coriolis mass in the xy-plane may be greater than the combined surface area of the corresponding elongated mass element pair, or it may be substantially equal to the combined surface area of the corresponding elongated mass element pair. The surface area of each Coriolis mass in the xy-plane may alternatively be less than the combined surface area of the corresponding mass element pair.

Each elongated mass element in the first, second, third and fourth pairs of elongated mass elements has a first side on a first side of said fixing point and a second side on the second side of said fixing point. The first side of the fixing point is opposite to the second side and the first sides of the mass elements in each pair of elongated mass elements may be adjacent to each other.

The gyroscope may further comprise one or more drive transducers for setting the first Coriolis mass quartet and the elongated mass elements into primary oscillating motion, and one or more sense transducers for detecting the secondary oscillating motion of the first Coriolis mass quartet and/or the elongated mass elements. The secondary oscillating motion is induced by the Coriolis force when the gyroscope undergoes angular rotation. Oscillation mode examples will be given below.

The optional central suspension arrangements described in this disclosure provide structural support for the Coriolis masses. Central synchronization arrangements may flexibly accommodate the desired primary and secondary oscillation modes and stiffly resist undesired oscillations where the movement of the Coriolis masses in relation to each other does not occur in the desired phase. The central synchronization arrangement may consist of a set of flexible elements which is interconnected with a set of rigid elements. The central synchronization arrangement may comprise open areas between the flexible elements and/or rigid elements. When the flexible elements and rigid elements are interconnected in a suitable manner, the desired accommodation and resistance properties can be achieved. Practical examples of such interconnections will be presented below.

In addition to being connected to each other, the flexible elements and rigid elements may also be connected to one or more central anchor points. The central synchronization arrangement may thereby also form a central suspension arrangement which supports the weight of the Coriolis masses.

The mass element suspenders provide structural support especially for the elongated mass elements, and flexibly accommodate the primary and secondary oscillating motion. The connecting spring arrangements couple the primary oscillating motion between the elongated mass elements and the corresponding Coriolis masses, and also flexibly accommodate the secondary oscillating motion in a manner which will be described in more detail below.

The signal-to-noise ratio by which the sense transducers can detect the induced Coriolis force depends on the amplitude of the secondary oscillation. The suspension and coupling arrangements should preferably flexibly allow the Coriolis masses and elongated mass elements to oscillate in the desired primary and secondary oscillation modes while stiffly resisting the oscillation of these masses in undesired oscillation modes. Examples of desired oscillation modes will be given below.

In this disclosure the device plane is illustrated and referred to as the xy-plane. The x-direction is referred to as the lateral direction and the y-direction as the transversal direction. The device plane may also be called the horizontal plane. The z-axis is perpendicular to the xy-plane. It may also be called the vertical axis. Linear and/or rotational motion where the proof mass remains level in the device plane when it moves away from its rest position may be referred to as "in-plane" motion or "motion in the device plane", while linear and/or rotational motion where the proof mass moves away from its rest position in a vertical direction may be referred to as "out-of-plane" motion, or "motion out of the device plane".

In this disclosure, the words "horizontal" and "vertical" merely refer to the device plane and a direction perpendicular to the device plane, respectively. The device plane is typically defined by the substrate in which the micromechanical structures are prepared. The words "horizontal" and "vertical" do not imply anything about how the device should be oriented during manufacture or usage. The words "above" and "below" refer to differences in the vertical z-coordinate when they describe the figures, and the words "up" and "down" refer to two opposite vertical directions.

Rotation about any axis perpendicular to the device plane will be referred to as rotation about the z-axis. Similarly, rotation about any axis parallel to the illustrated x-axis will be referred to as rotation about the x-axis, and rotation about any axis parallel to the illustrated y-axis will be referred to as rotation about the y-axis. The secondary oscillation modes which are induced by the Coriolis force in these three types of rotation will be referred to as z-axis secondary oscillation modes, x-axis secondary oscillation modes and y-axis secondary oscillation modes, respectively.

In this disclosure, the term "spring" refers to a device part which is flexible in at least one direction. The term "suspender" refers to a spring which is placed (possibly together with other device parts) between a fixed part (such as an anchor point) and a device part which oscillates when the device is operated. The terms "suspension structure" and "suspension arrangement" refer to a more complex combination of parts which together provide structural support to the mobile masses. Suspension structures and arrangements include at least one flexible suspender which provides the flexibility needed for accommodating the desired oscillation modes. They may include many suspenders and they may also include rigid parts. The suspenders typically bend or twist when the suspended mobile masses are in motion.

The rigid parts of a suspension structure/arrangement often move when the mobile masses are in motion (assuming that one or more flexible suspenders lie between said rigid parts and the corresponding anchor point). Some springs may form a synchronization structure, or they may be combined with rigid parts to form a synchronization structure. A synchronization structure may function also as a suspension structure. Alternatively, a synchronization structure may provide synchronization without providing structural support. More generally, springs which connect mass elements to each other and transmit oscillation from one mass element to another may also be called coupling springs or connecting springs. While transmitting movement is typically the primary function of coupling/connecting springs, they are also often designed to perform a synchronization function. The structures where such springs are included may be called coupling structures or connecting structures.

Throughout this disclosure, the term "synchronize", and phrases such as "structure A synchronizes oscillation mode X", have the following meaning. Structure A constitutes a mechanical connection in a system of interconnected mass elements which should preferably oscillate in the desired mode X, but preferably not in an undesired mode Y. Structure A exhibits a beneficial combination of rigidity and flexibility, so that the presence of structure A improves the relationship between the resonance frequency $F_X$ of mode X and the resonance frequency $F_Y$ of mode Y in the system.

The presence of structure A may, for example, increase the ratio $F_Y/F_X$ and/or the difference $F_Y-F_X$. The reference state against which this improvement is measured may in some cases be the same system of mass elements without structure A. Structure A is in this case needed only for synchronization. In other cases, when structure A is also needed for supporting the weight of the mass elements, the reference state against which the synchronization improvement is measured may be the same system of mass elements where A has been replaced with an alternative structure B which only gives structural support.

In general, all suspension, synchronization and coupling arrangements are optimized for support and for flexibility in certain directions and rigidity in other directions. These three variables may conflict with each other, so optimization means finding a good compromise solution. All elements of the gyroscope may influence these compromises.

In this disclosure, "radial" oscillation refers to linear movement in the xy-plane, away from a central point and towards a central point. "Tangential" oscillation refers to movement in the xy-plane, the xz-plane (lateral-vertical), or the yz-plane (transversal-vertical), along the tangent of an imaginary circle centred at a central point. Tangential oscillation in the xy-plane may be called in-plane tangential oscillation, while tangential oscillation in the xz- and yz-planes may be called out-of-plane tangential oscillation. Tangential oscillation may in practice be a mixture of linear movement and rotation. The suspension arrangement will typically determine how a Coriolis mass moves tangentially.

In the figures of this disclosure, the placement of the Coriolis masses corresponds to their rest positions unless otherwise stated. The oscillation directions of the proof masses in the different embodiments of this disclosure, and the phase relationships between the oscillations, will be illustrated using the symbols presented in FIG. 1. The white arrow shown on row 11 illustrates the primary oscillation mode which occurs in the device plane. The black arrow on row 12 illustrates the secondary mode which may occur (in the device plane) when the gyroscope undergoes rotation about the z-axis. The pair of symbols illustrated on row 13 will be used together to illustrate the out-of-plane movement of a pair proof masses when the gyroscope undergoes rotation about the x-axis. The pair of symbols illustrated on row 14 will be used together to illustrate the out-of-plane movement of a pair proof masses when the gyroscope undergoes rotation about the y-axis. On both rows 13 and 14, the cross illustrates motion away from the viewer and the dot illustrates movement towards the viewer.

In any embodiment presented in this disclosure, capacitive drive transducers may for example be implemented in an opening formed within one or more Coriolis masses. Capacitive sense transducers may be implemented either within an opening in one or more Coriolis masses or adjacent to one or more Coriolis masses to detect the z-axis secondary oscillation mode. Capacitive x-axis and y-axis sense transducers may be implemented above and/or below one or more Coriolis masses to detect the x-axis and/or y-axis secondary oscillation modes, respectively. Transducers are not illustrated in the figures of this disclosure.

First Embodiment

FIG. 2a illustrates schematically a gyroscope where a first lateral axis 291 and a first transversal axis 292 cross each other at a first gyroscope center point. A first, second, third and fourth Coriolis mass 211–214 form a first Coriolis mass quartet around the first gyroscope center point. The movement of the first Coriolis mass quartet is synchronized by a central synchronization arrangement 271.

The gyroscope comprises a first pair of elongated mass elements formed by first and second elongated mass elements 2211+2212. These two elements are transversally aligned outside of the first Coriolis mass 211. The gyroscope also comprises a second pair of elongated mass elements formed by third and fourth elongated mass elements 2221+2222, a third pair of elongated mass elements formed by fifth and sixth elongated mass elements 2231+2232 and a fourth pair of elongated mass elements formed by seventh and eighth elongated mass elements 2241+2242. The second pair is transversally aligned and the third and fourth pairs are laterally aligned as defined above. The first and second sides of the first elongated mass element 2211 have been marked with reference numbers 22111 and 22112, respectively. The reference numbers which mark the first and second sides of the other elongated mass elements follow the same convention. The elongated mass elements have first and second ends which correspond to the first and second sides, respectively.

The gyroscope comprises a set of first peripheral anchor points 2311–2312, 2321–2322, 2331–2332 and 2341–2342 placed around the periphery of the Coriolis mass quartet. The first peripheral anchor points are here depicted outside of the elongated mass elements, but they may alternatively be placed closer to the gyroscope center point than the corresponding elongated mass element, or they may be located in an opening within said mass element.

In FIG. 2a each elongated mass element is suspended from a separate first peripheral anchor point, so that each first peripheral anchor point corresponds to only one elongated mass element. The gyroscope in FIG. 2a comprises a set of first mass element suspenders 242. Each first mass element suspender 242 suspends an elongated mass element from the corresponding peripheral anchor point and flexibly accommodates the movement of the attached elongated mass element in the primary and secondary oscillation modes which will be introduced below.

It would alternatively be possible to reduce the number of first peripheral anchor points so that the two elongated mass elements which form a pair are suspended from the same first peripheral anchor point. The first mass element suspenders may then comprise a stiff portion which extends from said first peripheral anchor point to the corresponding elongated mass element and a flexible portion which accommodates the movement of the attached elongated mass element in the primary and secondary oscillation modes. This option has not been separately illustrated. In the arrangement of FIG. 2a, where each first peripheral anchor point lies close to the corresponding mass element, the support and flexion provided by first mass element suspenders 242 can be more easily integrated into a single, uniform suspender than if the anchor point is more distant from the elongated mass element.

Figure 2B:
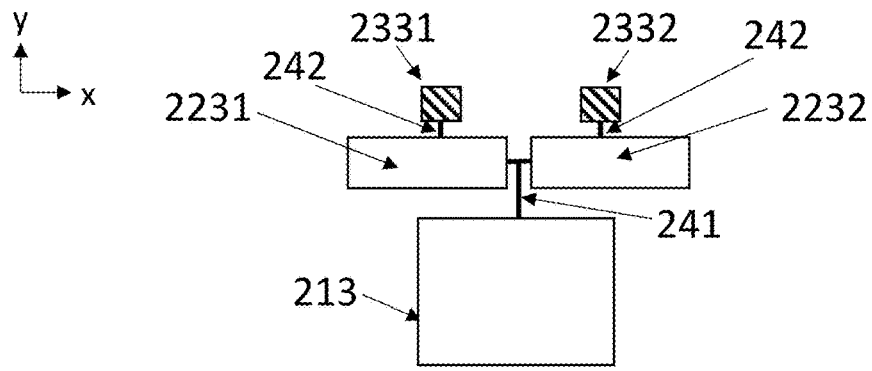
FIG. 2b illustrates an alternative connecting spring arrangement.

FIG. 2a also shows a connecting spring arrangement 241 between each pair of elongated mass elements and the corresponding Coriolis mass. In this case each elongated mass element is connected to the adjacent Coriolis mass with its own connecting spring arrangement, and each connecting spring arrangement is attached substantially to the midpoint of the corresponding elongated mass element. FIG. 2b illustrates an alternative option where the two elongated mass elements 2231 and 2232 share the same connecting spring arrangement 241 which couples the mass elements to each other with a first spring and contains a second spring which extends from the first spring to the adjacent Coriolis mass 213. Here each connecting spring arrangement is attached to the adjacent ends of two corresponding elongated mass elements which form a pair which is attached to the Coriolis mass. Either of these options can be used in any embodiment and any example presented in this disclosure. Furthermore, it is also possible to utilize the connecting spring arrangement of FIG. 2a for coupling the elongated mass elements to the adjacent Coriolis mass and use a separate mass element coupling spring for coupling the elongated mass elements to each other. Practical examples of these mass element suspenders, connecting spring arrangements and central suspension arrangements are given below.

Figure 2C:
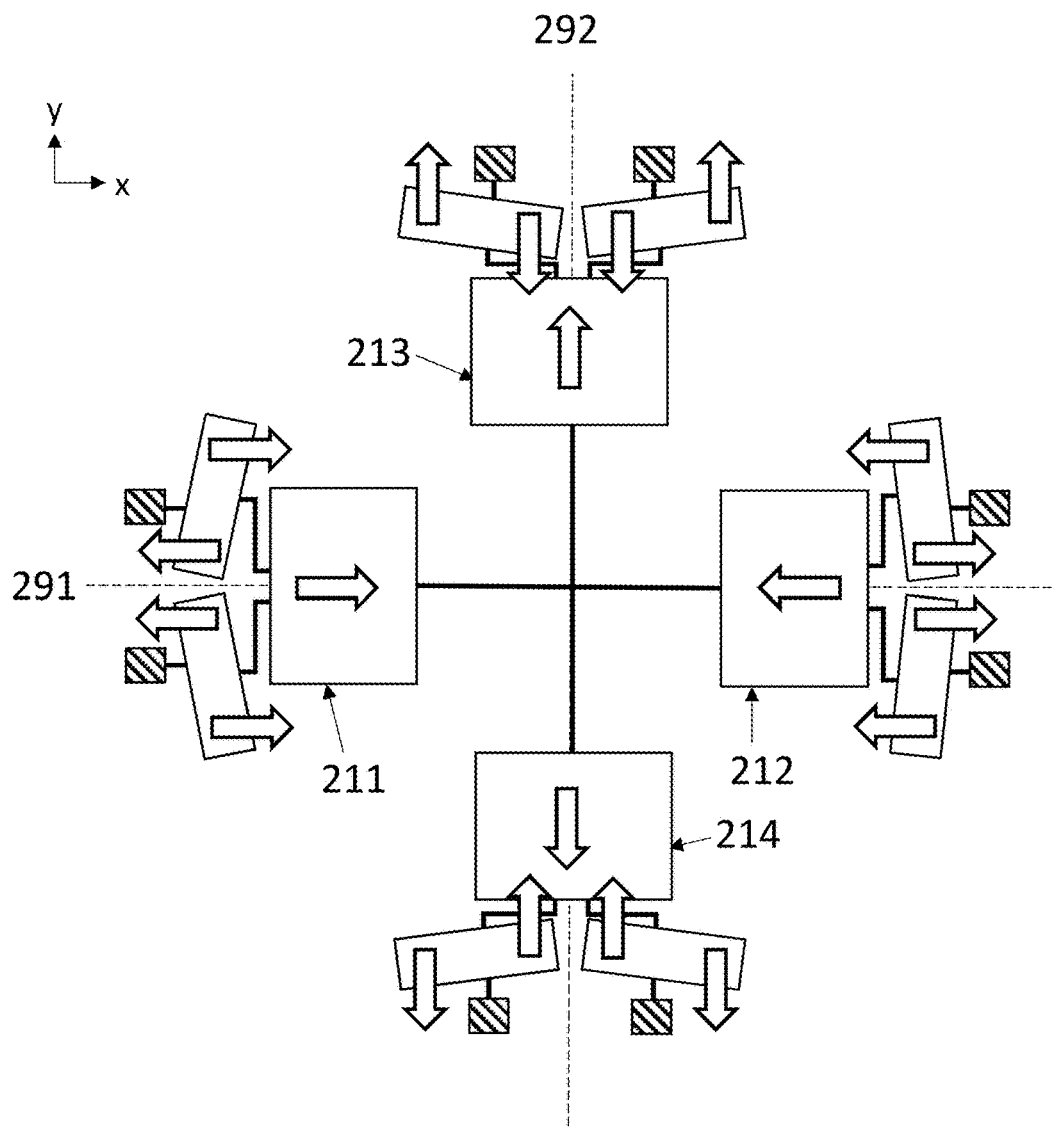
FIGS. 2c-2d illustrate two alternative primary oscillation modes.

FIG. 2c illustrates a first primary oscillation mode, where elements are showed away from their rest positions. Coriolis masses 211–214 all oscillate linearly in a radial direction in relation to the gyroscope center point. In the illustrated half of the primary oscillation cycle, Coriolis masses 211 and 212 move in linear translation towards the gyroscope center point when Coriolis masses 213 and 214 move in linear translation away from the center point. In the opposite half of the primary oscillation cycle (not illustrated), the motion of each Coriolis mass is reversed so that it moves in the opposite radial direction. In other words, in the first primary oscillation mode Coriolis masses 211 and 212 move in anti-phase on the first lateral axis 291, while Coriolis masses 213 and 214 move in anti-phase on the axis first transversal 292.

The elongated mass elements which are coupled to each Coriolis mass undergo rotational movement in the device plane. The rotation of each pair of elongated mass elements coupled to one of the Coriolis mass may be called anti-phase rotation since one of the mass elements rotates clockwise when the other rotates counter-clockwise, as shown in the figure. Again, in the opposite half of the primary oscillation cycle, their movement is reversed. The angle of rotation in the elongated mass elements has been greatly exaggerated for illustrative purposes. In FIG. 2b, the illustrated rotation phases of the elongated mass elements in relation to the movement of the corresponding Coriolis mass are obtained with the connecting spring arrangements 241 shown in FIG. 2a. If the connecting spring arrangement of FIG. 2b would be utilized instead, the phase would be the opposite (for example, when Coriolis mass 211 moves to the right, elongated mass element 2211 would turn counter-clockwise while 2212 would turn clockwise).

Figure 4A:
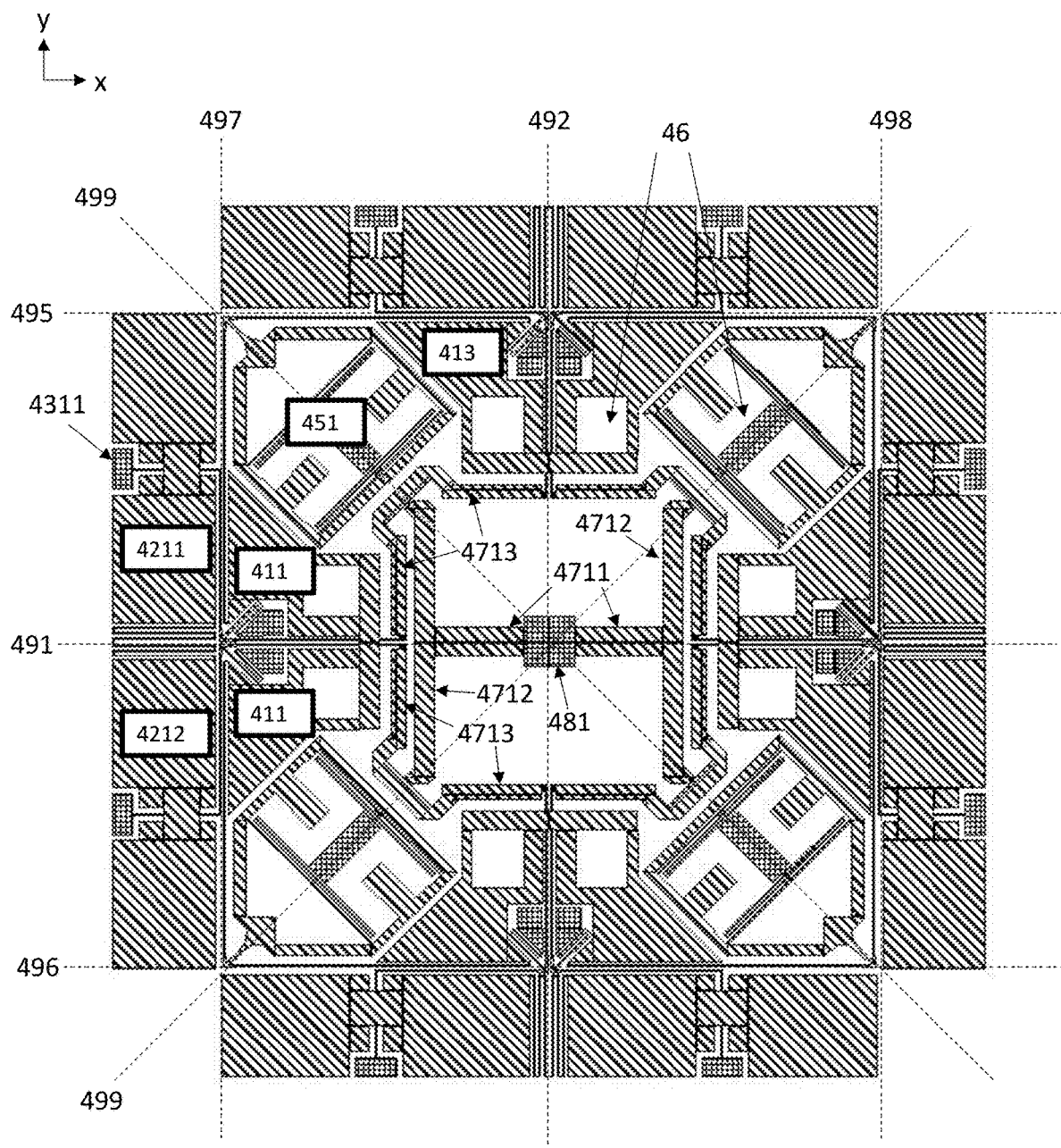
FIGS. 4a-4b illustrate a first practical example.
Figure 5A:
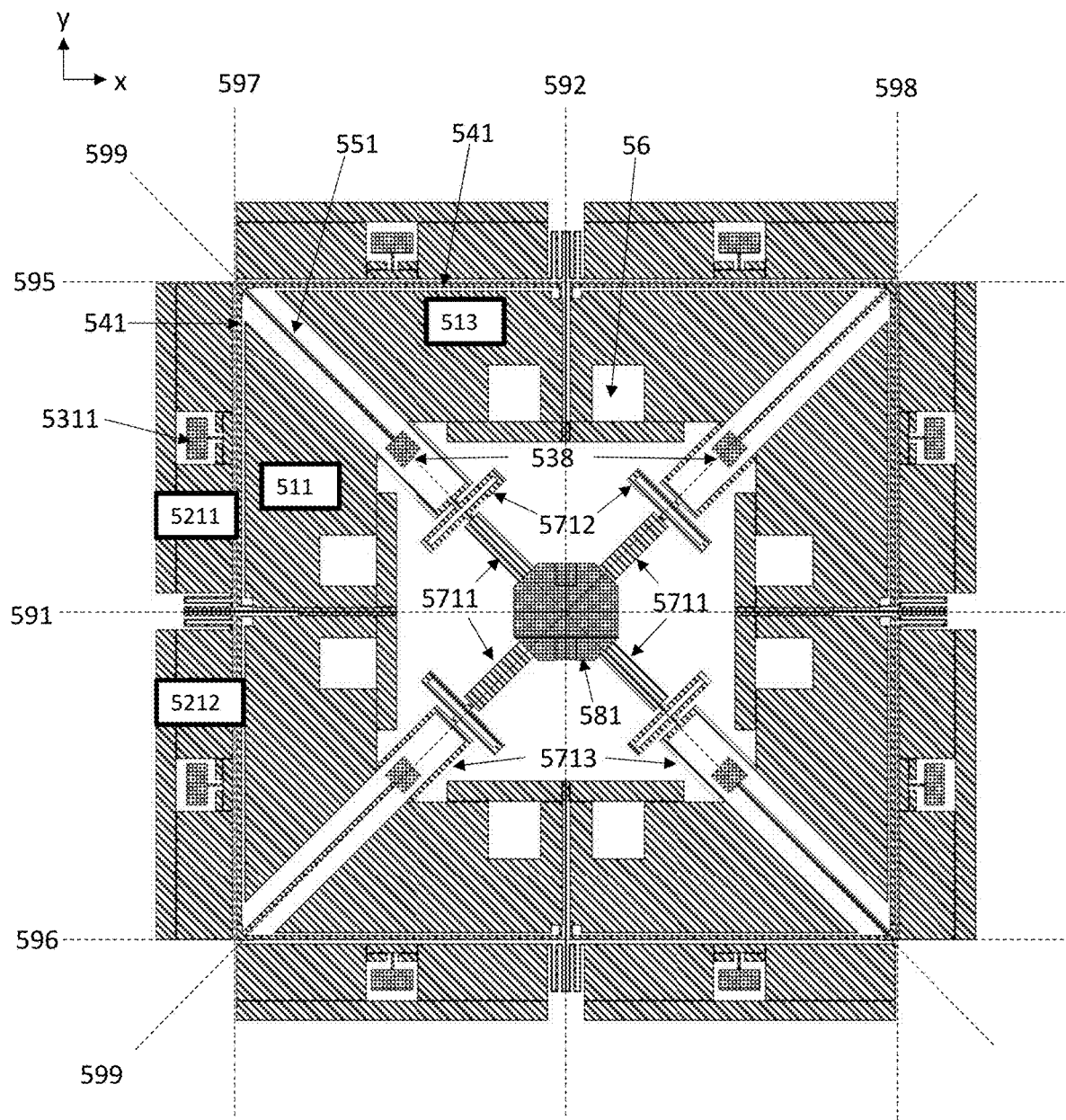
FIGS. 5a-5b illustrate a second practical example.

Each first mass element suspender is attached to the corresponding elongated mass element at an attachment point which lies at or near the midpoint of said elongated mass element. The attachment point may lie at the edge of said elongated mass element as FIG. 2a for example illustrates, or it may alternatively lie within an opening in the elongated mass element as FIGS. 4a and 5a illustrate. The first mass element suspenders may optionally be configured to provide balanced suspension which allows each elongated mass element to rotate in the primary oscillation mode around a vertical z-axis which substantially crosses the center of gravity of said elongated mass element. The center of gravity of each mass element may lie at or close to the midpoint of said elongated mass element.

A further option (which may be implemented either independently of the previous option or together with it) is that the first mass element suspenders are configured to provide balanced suspension in the x-axis and y-axis secondary oscillation modes which will be discussed below. In that case the first mass element suspenders also allow the attached elongated mass element to rotate out of the device plane in one of the said secondary oscillation modes around a horizontal (either lateral or transversal, depending on the elongated mass element in question) axis which substantially crosses the center of gravity of said elongated mass element. Each elongated mass element will then move in primary and/or secondary oscillation as a rotating moment of inertia which comprises minimal movement of its center of gravity. These considerations on balanced suspension apply also in the second primary oscillation mode presented below, to all x-axis and y-axis secondary oscillation modes and all practical examples presented in this disclosure.

Figure 2D:
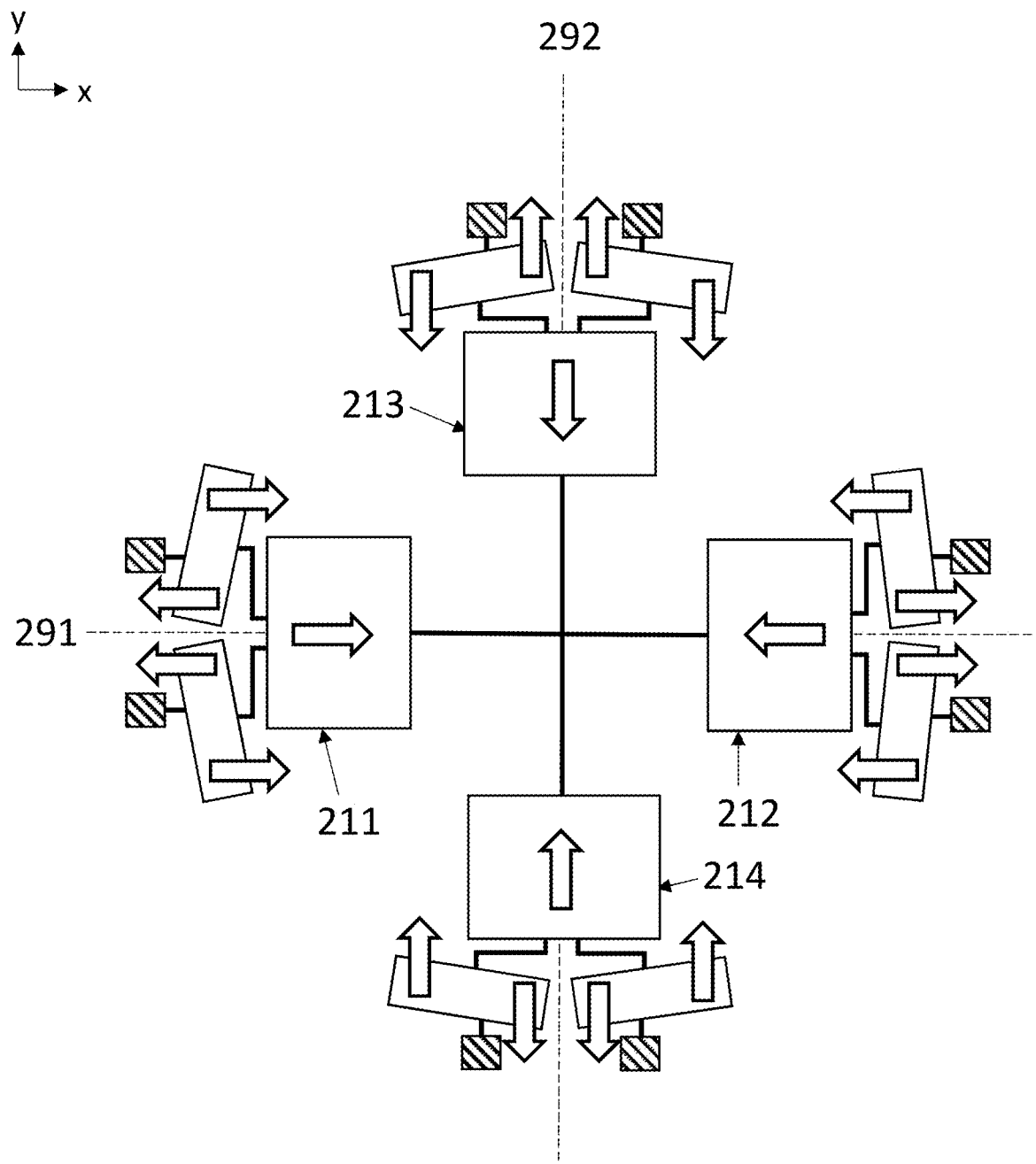

FIG. 2d illustrates a second primary oscillation mode, which is an alternative to the first. Device parts are here illustrated away from their rest positions. Either primary oscillation mode can be used. Based on the selection of the primary oscillation mode, the secondary oscillation modes will exhibit certain differences. Furthermore, the central synchronization arrangement has to be designed to accommodate the selected primary oscillation mode.

In the second primary oscillation mode Coriolis masses 211-214 all oscillate linearly in a radial direction in relation to the gyroscope center point. However, unlike in FIG. 2c, in the illustrated half of the primary oscillation cycle all four Coriolis masses 211-214 move simultaneously in linear translation towards the gyroscope center point. In the opposite half of the primary oscillation cycle (not illustrated), all four Coriolis masses 211-214 move simultaneously in the opposite radial direction, outward from the gyroscope center point. As in FIG. 2c, Coriolis masses 211 and 212 move in anti-phase on the first lateral axis 291, while Coriolis masses 213 and 214 move in anti-phase on the axis first transversal 292.

The elongated mass elements which are coupled to each Coriolis mass undergo the same rotational movement as in the first primary oscillation mode, and this oscillation is in synchrony with the oscillation of the Coriolis mass to which each elongated mass element is coupled, as FIG. 2d illustrates. In FIG. 2d the rotation phase of each elongated mass element in relation to the movement of the corresponding Coriolis mass is the same as in FIG. 2c. As in FIG. 2c, utilizing the connecting spring arrangement of FIG. 2b would also in FIG. 2d produce rotation in the opposite phase.

Figure 2E:
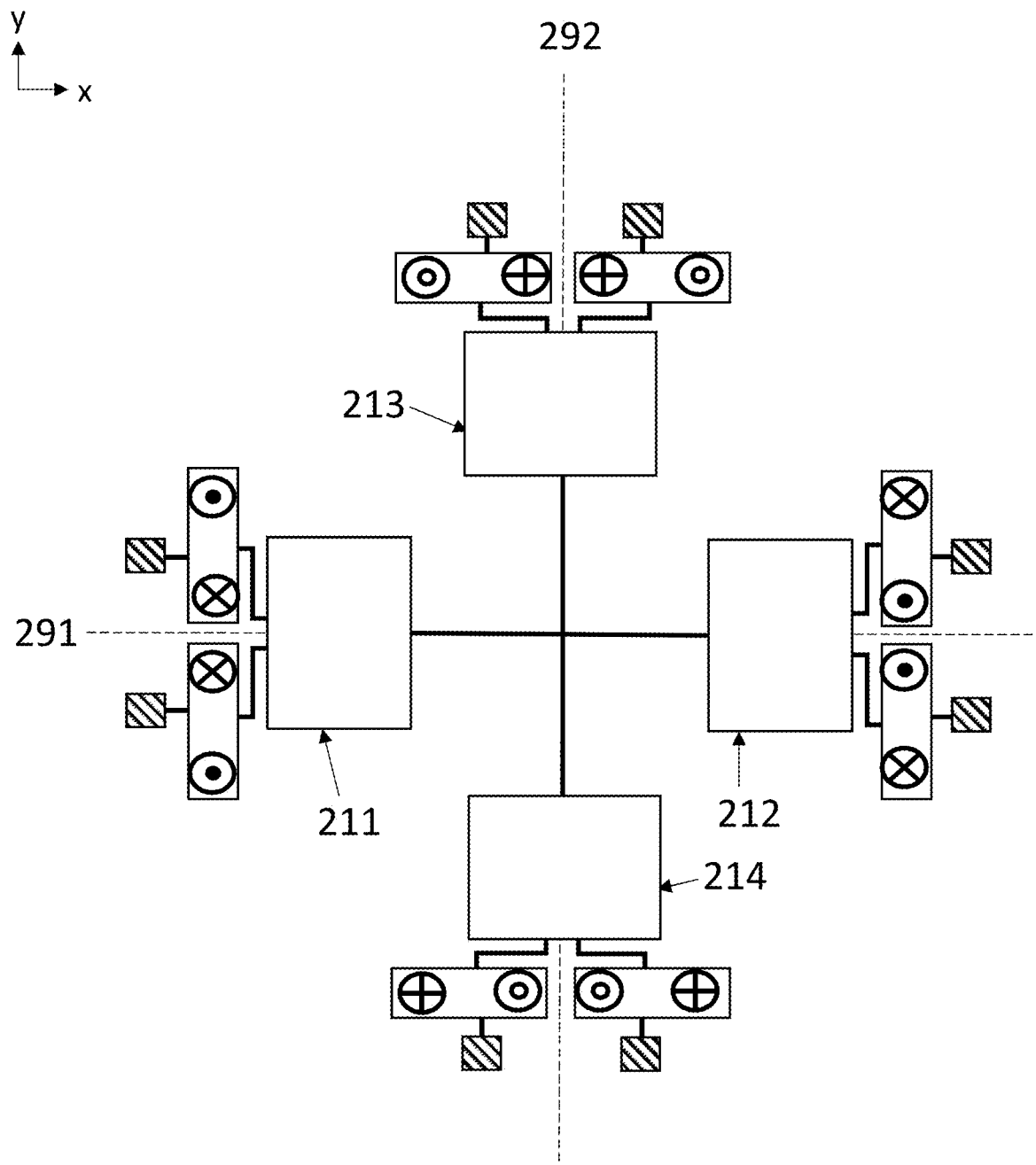
FIG. 2e illustrate the x-axis and y-axis secondary oscillation modes.

FIG. 2e illustrates the x-axis and y-axis secondary oscillation modes that are induced by the Coriolis force when the gyroscope undergoes rotation about the x-axis and y-axis, respectively. The elongated mass elements here rotate out of the xy-plane. In the y-axis secondary oscillation mode, the first ends of the first pair of elongated mass elements move down and their second ends move up when, in the second pair of elongated mass elements, the first ends move up and the second ends down. In other words, the elongated mass elements in the first pair rotate in anti-phase about lateral rotation axes in relation to each other, just as they rotate in anti-phase about vertical axes in FIGS. 2c and 2d. Similarly, the first pair as a whole rotates in anti-phase in relation to the second pair.

In the x-axis secondary oscillation mode, the first ends of the third pair of elongated mass elements move down and their second ends move up when, in the fourth pair of elongated mass elements, the first ends move up and the second ends down. The elongated mass elements in the third pair thereby also rotate in anti-phase, in this case about transversal rotation axes, just as they rotate in anti-phase about vertical axes in FIGS. 2c and 2d. The third pair as a whole rotates in anti-phase in relation to the fourth pair.

The phase relationships between the x-axis and y-axis secondary oscillation modes illustrated in FIG. 2e correspond to the second primary oscillation mode. If the first primary oscillation mode is used, the secondary oscillation phases of the elongated mass elements coupled to Coriolis masses 211-212 in relation to the oscillation phases of the elongated mass elements coupled to Coriolis masses 213-214 will be the reverse of what is illustrated in FIG. 2e (this has not been separately illustrated).

It is noted that the Coriolis masses 211-214 do not participate in the x-axis and y-axis secondary oscillation modes illustrated in FIG. 2e (nor do they participate in these modes when the first primary oscillation mode is used). In other words, the Coriolis masses 211-214 remain in the xy-plane even when the gyroscope undergoes rotation about the x-axis or the y-axis. The x-axis and y-axis secondary oscillation modes are then detected only with one or more sense transducers which measure the out-of-plane movement the elongated mass elements. The sense transducers dedicated for measuring oscillation about the x-axis and y-axis can for example be constructed by using one end of an elongated mass element as a first capacitive electrode and a vertically adjacent fixed electrode on the wall of the device package (or other enclosure) as the second capacitive electrode. The sense transducers for detecting rotation about the x-axis and y-axis may thereby be placed around the periphery of each gyroscope center point. The central suspension structure may for example be stiff in the out-of-plane direction to keep the Coriolis masses 211-214 in the xy-plane. These considerations on the x-axis and y-axis secondary oscillation modes and the associated sense transducers apply to all embodiments and examples presented in this disclosure.

Coriolis masses 211-214 do undergo secondary oscillation when the gyroscope rotates about the z-axis. The central synchronization arrangement and the coupling to the elongated mass elements flexibly accommodates a first z-axis secondary oscillation mode, which is induced by the Coriolis force if the primary oscillation mode is the first primary oscillation mode and the gyroscope undergoes angular rotation about the z-axis. The first z-axis secondary oscillation mode is illustrated in FIG. 2f.

In this secondary oscillation mode Coriolis masses 211-214 all move tangentially in relation to the first gyroscope center point in the directions shown in the figure. In the opposite half of the oscillation cycle, each of these Coriolis masses moves in the opposite tangential direction. The gyroscope should then also comprise sense transducers for detecting the oscillation of Coriolis masses 211-214 in the first z-axis secondary oscillation mode.

However, depending on how the central synchronization arrangement and the coupling to the elongated mass elements is constructed, the tangential oscillation of Coriolis masses 211-214 may be a mixture of translational and rotational movement, which may in some cases make it difficult to accurately detect z-axis secondary oscillation amplitudes from the movement of these masses. Additional detection masses 251-254 may be added to the gyroscope. The diagonal motion of these detection masses (in relation to the first gyroscope center point) facilitates easier detection of the first z-axis secondary oscillation mode.

Figure 2F:
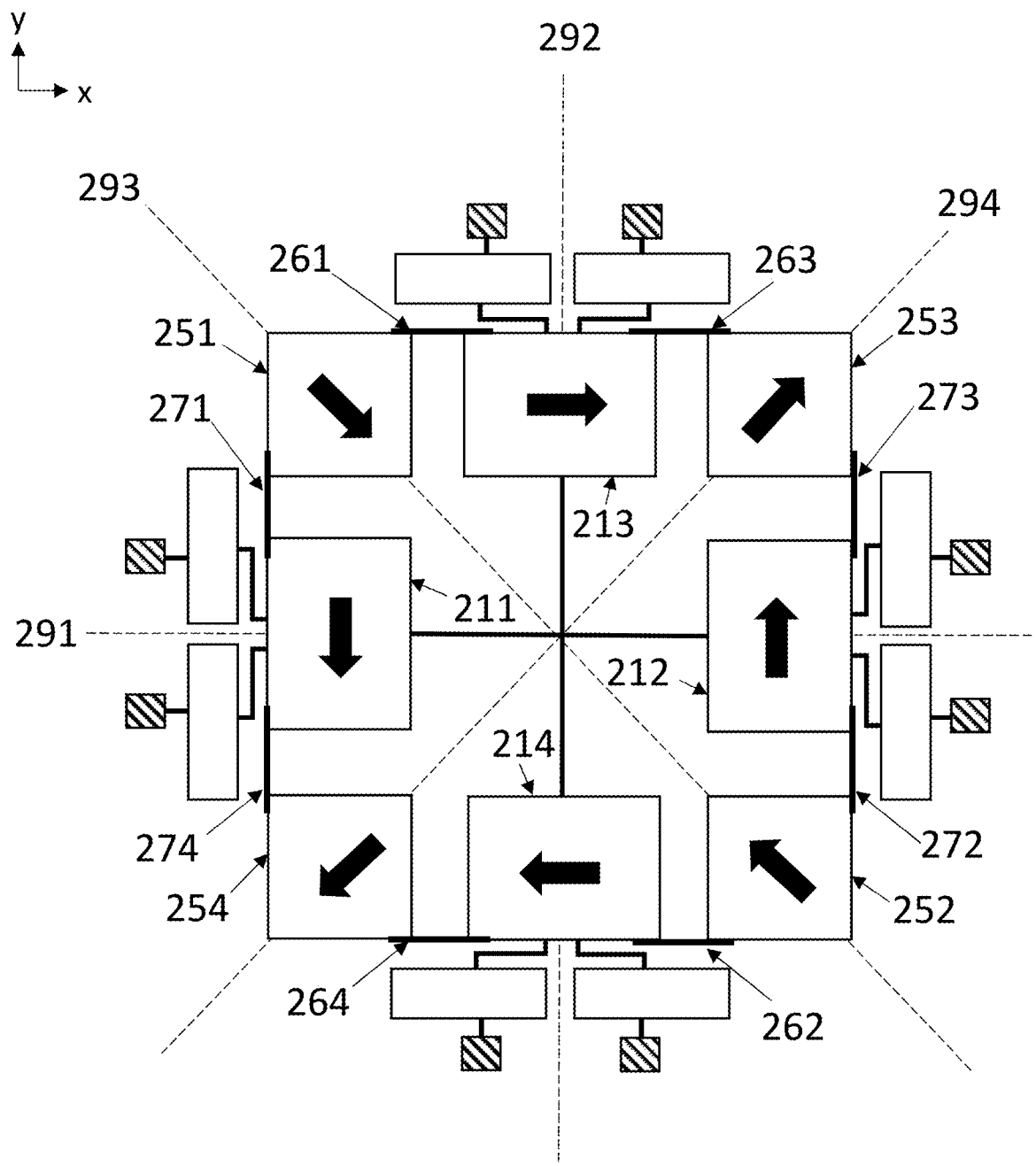
FIGS. 2f-2g illustrate two alternative z-axis secondary oscillation modes.

The gyroscope illustrated in FIG. 2f comprises first, second, third and fourth detection masses 251-254 which together form a detection mass quartet which in its rest position is arranged symmetrically around the first gyroscope center point. The first and second detection masses 251 and 252 are aligned on a first diagonal axis 293 which crosses the lateral axis 291 and the transversal axis 292 at an angle of 45 degrees and crosses the gyroscope first center point. The third and fourth detection masses 253 and 254 are aligned on a second diagonal axis 294 which is orthogonal to the first diagonal axis 293 and crosses the first gyroscope center point.

A lateral corner spring 261–264 extends to each detection mass (251–254, respectively) from the laterally adjacent Coriolis mass. A transversal corner spring 271–274 extends to each detection mass (251–254, respectively) from the transversally adjacent Coriolis mass.

In other words, first and third lateral corner springs 261 and 263 extend from the third Coriolis mass 213 to the first (251) and the third (253) detection masses, respectively, as illustrated in FIG. 2f. Second and fourth lateral corner springs 262 and 264 extend from the fourth Coriolis mass 214 to the second (252) and the fourth (254) detection masses, respectively. First and fourth transversal corner springs 271 and 274 extend from the first Coriolis mass 211 to the first (251) and the fourth (254) detection masses, respectively, while second and third transversal corner springs 272 and 273 extend from the second Coriolis mass 212 to the second (252) and the third (253) detection masses, respectively.

When the Coriolis masses 211–214 oscillate tangentially in the first z-axis secondary oscillation mode, this tangential oscillation is transmitted to the detection masses by the lateral and transversal corner springs. The oscillation of proof masses 211 and 213 in opposite tangential directions pulls detection mass 251 toward the first gyroscope center point, while the oscillation of proof masses 212 and 213 in opposite directions pushes detection mass 253 away from the first gyroscope center point. Since the momentum imparted by the corner springs in the lateral and transversal directions is equal (or very close to equal), the detection masses move in radial oscillation along the diagonal axes 293 and 294, in the manner illustrated in FIG. 2f.

The lateral corner springs are stiff in the lateral direction and flexible in the transversal direction, while the transversal corner springs are stiff in the transversal direction and flexible in the lateral direction. In other words, due to their dimensions, all corner springs have the radial flexibility needed for flexibly accommodating the first primary oscillation mode but are much stiffer in the tangential direction.

This means that the primary oscillation mode first Coriolis mass quartet will not set the detection masses 251–254 in motion. Instead, detection masses 251–254 will remain substantially stationary unless the gyroscope undergoes rotation about the z-axis.

Each detection mass may be suspended from a diagonally placed anchor point (not illustrated) which lies on the diagonal axis (293, 294) on which said detection mass is aligned. The diagonal anchor point may, for example, be located within an opening formed in said detection mass.

Capacitive sense transducers may be implemented either within openings in one or more detection masses, or adjacent to one or more detection masses, to detect their illustrated radial movement in the first z-axis secondary oscillation mode.

Figure 2G:
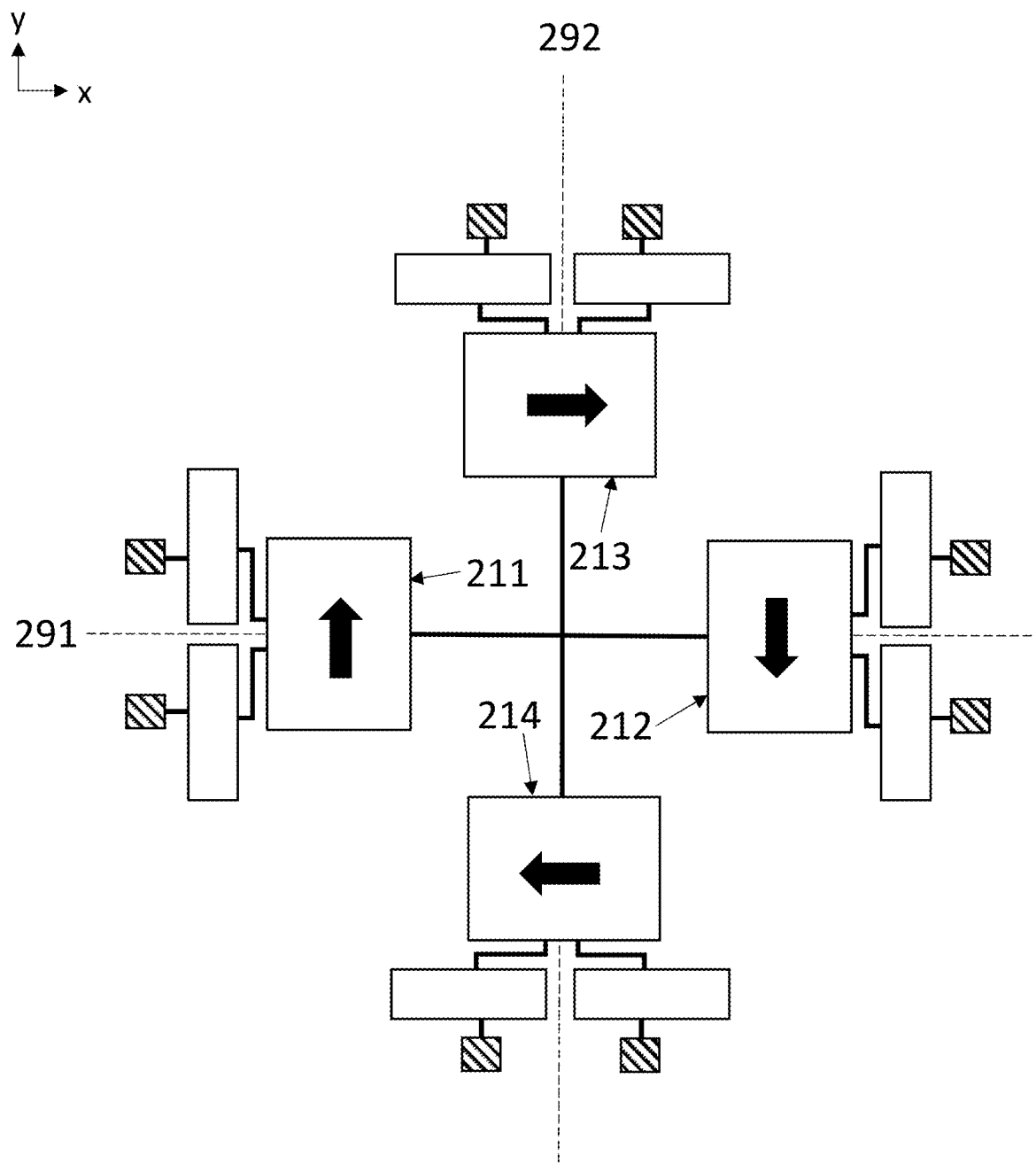

FIG. 2g illustrates a second z-axis secondary oscillation mode which is induced by the Coriolis force when the first Coriolis mass quartet is driven in the second primary oscillation mode and the gyroscope undergoes rotation about the z-axis. In this case the Coriolis masses 211–214 all move in the same tangential direction in relation to the first gyroscope center point. In the opposite half of the oscillation cycle, each of these Coriolis masses moves in the opposite tangential direction. Capacitive sense transducers may be implemented either within openings in the Coriolis masses 211–214, or adjacent to one or more of these Coriolis masses, to detect their movement in the second z-axis secondary oscillation mode. It would also be possible in FIG. 2g to utilize additional detection masses such as 241–244 in FIG. 2f and connect sense transducers to them.

The connecting spring arrangements 241 should preferably exhibit flexibility for the z-axis secondary oscillation mode so that the secondary oscillation of the Coriolis masses 211–214 in FIGS. 2f-2g is not transmitted to the elongated mass elements which are coupled to these Coriolis masses. This can be achieved with the example connecting spring arrangements which will be presented below.

Second Embodiment

Figure 3A:
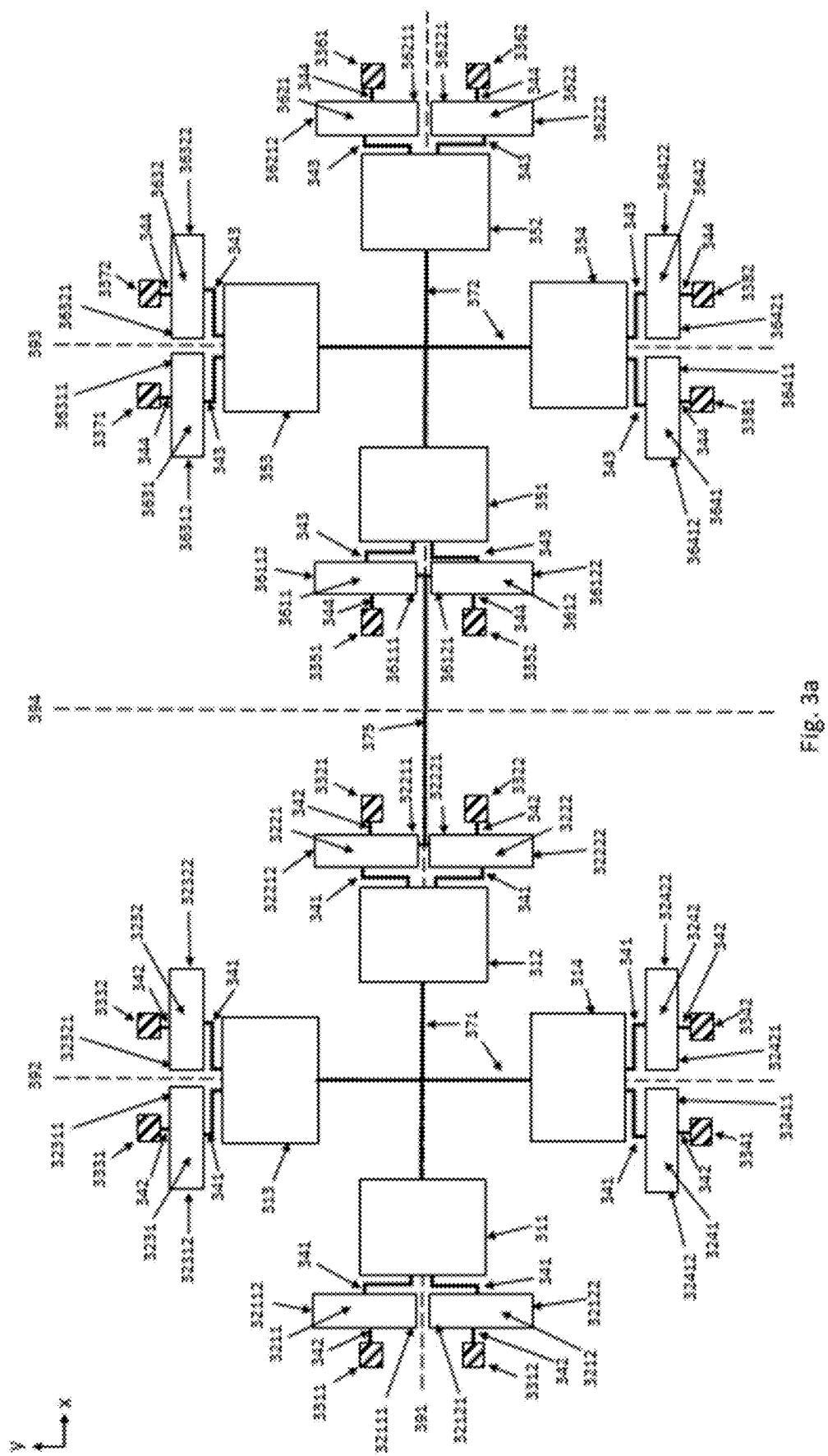
FIG. 3a illustrates a gyroscope according to a second embodiment.

FIG. 3a illustrates a gyroscope where reference numbers 311–314, 3211, 32111, 32112, 3212, 32121, 32122, 3221, 32211, 32212, 3222, 32221, 32222, 3231, 32311, 32312, 3232, 32321, 32322, 3241, 32411, 32412, 3242, 32421, 32422, 3311, 3312, 3321, 3322, 3331, 3332, 3341, 3342, 341–342, 371 and 391–392 correspond to reference numbers 211 - 214, 2211, 22111, 22112, 2212, 22121, 22122, 2221, 22211, 22212, 2222, 22221, 22222, 2231, 22311, 22312, 2232, 22321, 22322, 2241, 22411, 22412, 2242, 22421, 22422, 2311, 2312, 2321, 2322, 2331, 2332, 2341, 2342, 241–242, 271 and 291–292, respectively, in FIG. 2a.

The gyroscope further comprises a second Coriolis mass quartet which in its rest position lies in the device plane and a corresponding second quartet center point which lies on the first lateral axis 391.

The second Coriolis mass quartet comprises four Coriolis masses 351–354 which are in their rest position symmetrically arranged around the second quartet center point where the first lateral axis 391 crosses a second transversal axis 393 orthogonally in the device plane. The first and second Coriolis masses 351–352 in the second Coriolis mass quartet are aligned on the first lateral axis 391 in their rest position, and the third and fourth Coriolis masses 353–354 in the second Coriolis mass quartet are aligned on the second transversal axis 393 in their rest position. The gyroscope further comprises a third transversal axis 394 which crosses the first lateral axis 391 substantially halfway between the first quartet center point and the second quartet center point.

The rest positions of the first, second, third and fourth Coriolis masses in relation to the corresponding quartet center point are the same in both the first (311–314) and the second (351–354) quartet. The third Coriolis masses (313, 353) in both Coriolis mass quartets are located on a first side of the first lateral axis 391, and the fourth Coriolis masses (314, 354) in both Coriolis mass quartets are located on a second side of the first lateral axis 391. The second Coriolis mass (312) in the first Coriolis mass quartet and the first Coriolis mass (351) in the second Coriolis mass quartet are adjacent to each other on opposing sides of the third transversal axis (394).

The gyroscope further comprises a second central synchronization arrangement (372) centred around the second quartet center point inside the second Coriolis mass quartet (351–354).

The gyroscope further comprises a fifth (3611–3612), sixth (3621–3622), seventh (3631–3632) and eighth (3641–3642) pair of elongated mass elements. The elongated mass elements (3611, 3612) which form the fifth pair are transversally aligned on opposing sides of the first lateral axis 391 outside of the first Coriolis mass 351 in the second Coriolis mass quartet. The elongated mass elements (3621, 3622) which form the sixth pair are transversally aligned on opposing sides of the first lateral axis 391 outside of the second Coriolis mass 352 in the second Coriolis mass quartet. The elongated mass elements (3631, 3632) which form the seventh pair are laterally aligned on opposing sides of the second transversal axis 393 outside of the third Coriolis mass 353 in the second Coriolis mass quartet. The elongated mass elements (3641, 3642) which form the eighth pair are laterally aligned on opposing sides of the second transversal axis 393 outside of the fourth Coriolis mass 354 in the second Coriolis mass quartet.

Each elongated mass element in the fifth, sixth, seventh and eighth pairs of elongated mass elements is suspended from a corresponding second peripheral anchor point (3351–3352, 3361–3362, 3371–3372, 3381–3382) by a second mass element suspender 344. Said second mass element suspender 344 extends from said second peripheral anchor point to a fixing point located substantially at the midpoint of said elongated mass element. Each elongated mass element in the fifth, sixth, seventh and eighth pairs of elongated mass elements is attached to the corresponding Coriolis mass with a connecting spring arrangement 343.

The gyroscope may also comprise a lateral synchronization spring 375 which couples the second pair of elongated mass elements 3221+3222 to the fifth pair of elongated mass elements 3611+3612 across the third transversal axis 394. The lateral synchronization spring 375 may for example extend from a spring which couples elements 3221+3222 to each other to another spring which couples elements 3611+3612 to each other. This will be illustrated in the practical examples below.

Everything that was said about the first mass element suspenders and connecting spring arrangements in the first embodiment applies to the second mass elements and connecting spring arrangements in this embodiment as well.

FIG. 3b illustrates a first primary oscillation mode. Device parts are here illustrated away from their rest positions. Both the first and the second Coriolis mass quartets and the coupled elongated mass elements here oscillate in a manner which corresponds to the first primary oscillation mode illustrated in FIG. 2c. They do so in anti-phase, so that, for example, the first Coriolis mass 311 in the first quartet moves to the right (towards the first gyroscope center point) when the first Coriolis mass in the second quartet 351 moves to the left (away from the second gyroscope center point), and vice versa. Central lateral synchronization spring 375 can couple the primary oscillation of the first quartet to that of the second quartet. The oscillation of each Coriolis mass quartet may be further synchronized by the corresponding central synchronization arrangement.

Figure 3C:
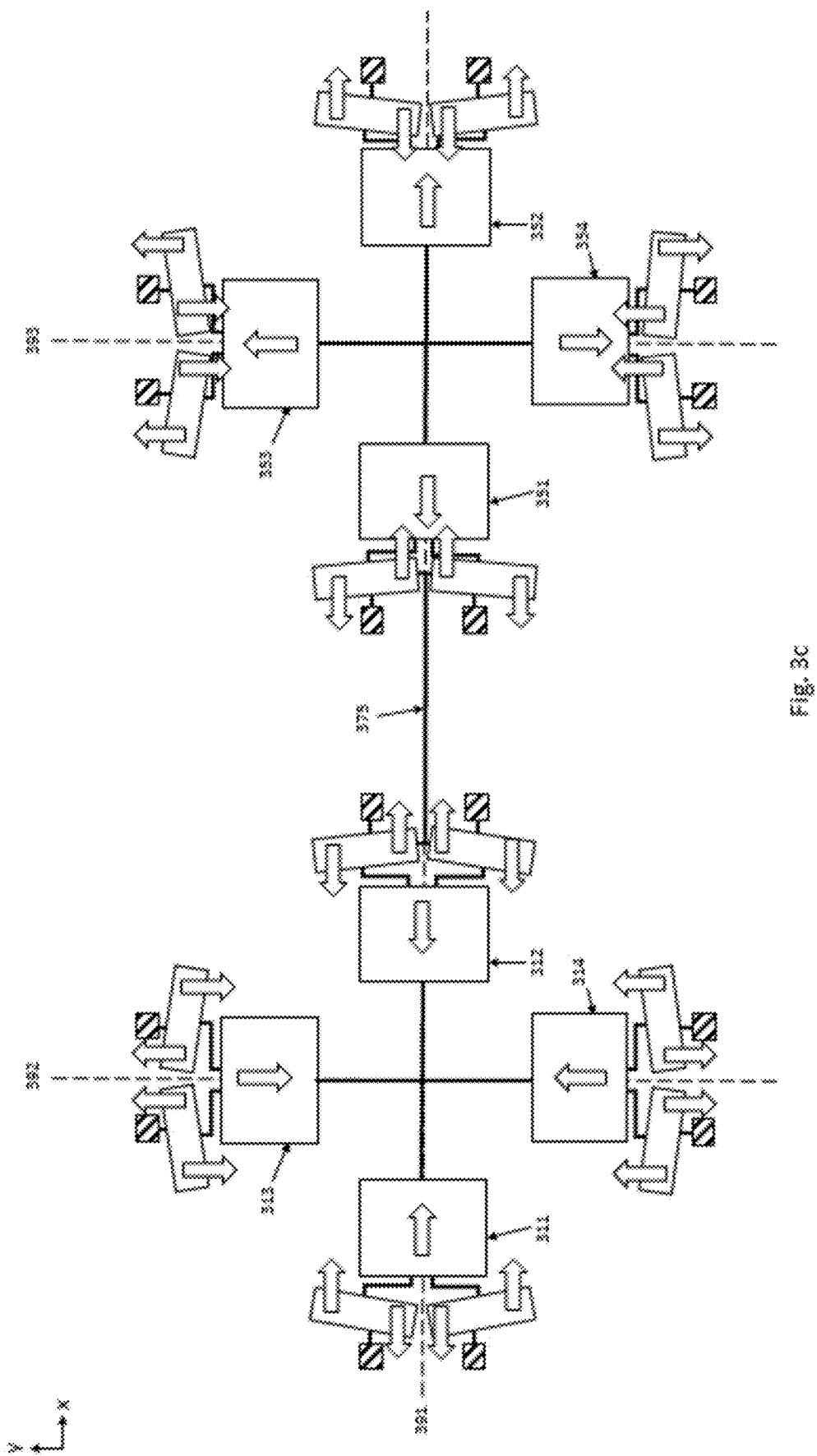

FIG. 3c illustrates a second primary oscillation mode. Device parts are here illustrated away from their rest positions. Both the first and the second Coriolis mass quartets and the coupled elongated mass elements here oscillate in a manner which corresponds to the second primary oscillation mode illustrated in FIG. 2d. They once again do so in anti-phase, so that all Coriolis masses in the first quartet move toward the first gyroscope center point when all masses in the second quartet move away from the second gyroscope center point, and vice versa. Since masses 312 and 351 always move in the same direction along the first lateral axis, the lateral synchronization spring 375 can again effectively couple the oscillation of the first quartet to that of the second quartet. The oscillation of each Coriolis mass quartet may again be further synchronized by the corresponding central synchronization arrangement.

In both the first and the second primary oscillation mode, Coriolis masses 311 and 312 move in anti-phase on the first lateral axis 391 and Coriolis masses 351 and 352 also move in anti-phase on the first lateral axis 391, while Coriolis masses 313 and 314 move in anti-phase on the axis first transversal 392 and Coriolis masses 353 and 354 move in anti-phase on the second transversal axis 393.

The x-axis and y-axis secondary oscillation modes which correspond to the first and second primary oscillation modes illustrated in FIGS. 3b and 3c correspond to the oscillation modes which were above discussed with reference to FIG. 2e. Furthermore, the z-axis secondary oscillation modes which correspond to the first and second primary oscillation modes illustrated in FIGS. 3b and 3c correspond to the oscillation modes which were discussed above with reference to FIGS. 2f and 2g, respectively. Additional detection masses may be implemented according to FIG. 2f around both the first and the second Coriolis mass quartets when the first primary oscillation mode or the second primary oscillation mode is utilized.

PRACTICAL EXAMPLES

FIG. 4a illustrates a first practical example. Reference numbers 411, 413, 4211, 4212, 4311, 491 and 492 correspond to reference numbers 211, 213, 2211, 2212, 2311, 291 and 292, respectively, in FIG. 2a. 481 indicates a central anchor point. To preserve clarity, not all Coriolis masses, elongated mass elements and first peripheral anchor points have been marked with a reference number in FIG. 4a. Reference number 451 corresponds to reference number 251 in FIG. 2f, and three other diagonally placed detection masses are also present in the gyroscope. The shapes of the Coriolis masses and detection masses in FIG. 4a allows a tightly packed square-shaped configuration. Other shapes could also be used.

A second lateral axis 495 and a third lateral axis 496 are indicated in FIG. 4a. The second end of the elongated mass element 4211 and the outer edge of the third Coriolis mass 413 are aligned on the second lateral axis 495. The second end of the elongated mass element 4212 and the outer edge of the fourth Coriolis mass are aligned on the third lateral axis 496. The second ends of the two elongated mass elements attached to the second Coriolis mass are also aligned with the second and third lateral axes, respectively, as FIG. 4a illustrates.

Correspondingly, a fourth transversal axis 497 and a fifth transversal axis 498 are indicated in the figure. The second ends of the two elongated mass elements attached to the third Coriolis mass are aligned with the fourth and fifth transversal axes, respectively, as FIG. 4a illustrates. The outer edge of the first Coriolis mass 411 is aligned with the fourth transversal axis 497 and the outer edge of the second Coriolis mass 412 is aligned with the fifth transversal axis 498. The second ends of the two elongated mass elements attached to the fourth Coriolis mass are also aligned with the fourth and fifth transversal axes 497 and 498, respectively, as FIG. 4a shows.

The first peripheral anchor points such as 4311 are located within an opening in the corresponding elongated mass element, in this case 4211. The Coriolis masses and detection masses comprise openings such as 46. Drive transducers, z-axis sense transducers, primary sense transducers, quadrature compensation transducers and/or other transducers may be implemented in these openings.

The central suspension arrangement comprises two rigid central bars 4711 which extend in opposite lateral directions from the central anchor point 481 and two rigid continuation bars 4712 which extend substantially orthogonally in two opposite transversal directions from the ends of the rigid central bars 4711. The central bars could alternatively extend in opposite transversal directions from the central anchor point 481, so that the central suspension arrangement would be turned around by 90 degrees.

The central suspension arrangement also comprises a central synchronization arrangement which accommodates and synchronizes the movement of the Coriolis masses in the first primary oscillation mode. The central synchronization arrangement comprises four corner elements 4713 which are attached to the ends of said rigid continuation bars 4712. The attachment point of each corner element may lie substantially on the corresponding diagonal axis 499. The corner elements 4713 may together form an approximately square shape around the corresponding gyroscope center point in their rest position.

The corner elements are attached to the Coriolis masses and to each other with in-plane flexible springs which allow the corner elements 4713 to turn in relation to each other as the Coriolis masses move in the first primary oscillation mode. The corner elements 4713 maintain their shape stiffly in the device plane as they turn, so that one end of corner element moves toward the gyroscope center point while the other moves away from it which helps to maintain the Coriolis masses in the first primary oscillation mode illustrated in FIG. 2c.

More generally, in any embodiment where the first primary oscillation mode shown in FIG. 2c or 3b is used, the central suspension structure may comprise, around each center point, a suspension arrangement which comprises a symmetrical closed pattern in the device plane which is anchored to the corresponding central anchor point and coupled to each corresponding Coriolis mass so that the symmetrical closed pattern will easily contract on the lateral axis with a matching forced expansion on the corresponding transversal axis, and vice versa.

Figure 4B:
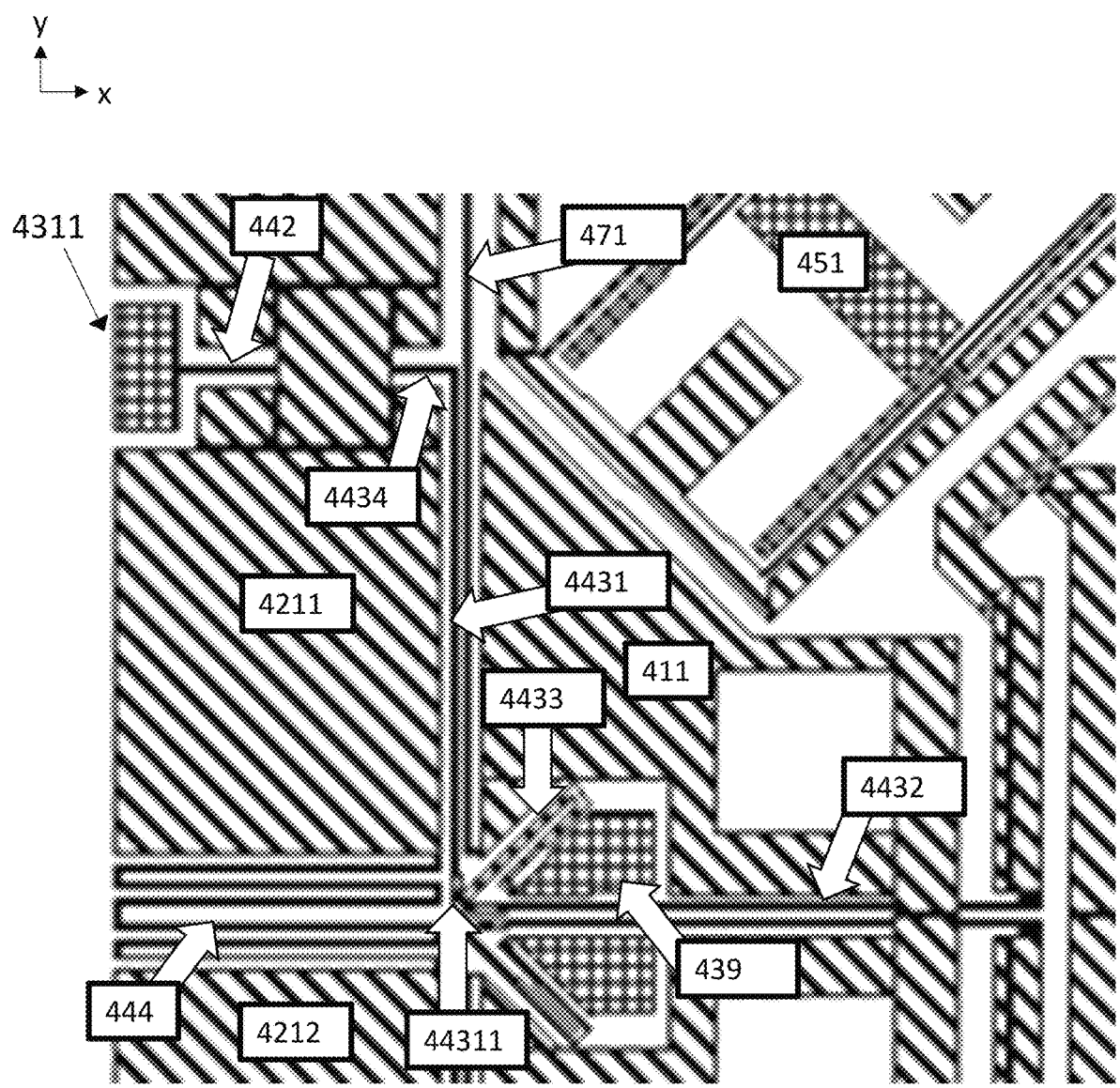

FIG. 4b illustrates in more detail the mass element suspenders and connecting spring arrangements utilized in FIG. 4a. Reference number 442 corresponds to reference number 242 in FIG. 2a, while reference number 471 corresponds to 271 in FIG. 2f. The mass element suspender 442 supports the weight of the attached elongated mass element 4211 and accommodates the in-plane turning movement of this element in both the first and the second primary oscillation mode by bending in the device plane as the mass element turns in the device plane. The mass element suspender 442 accommodates the out-of-plane turning movement of the attached mass element 4211 in the y-axis secondary oscillation mode by undergoing torsional twisting.

The connecting spring arrangement comprises a first spring 4431 which extends substantially parallel to the first side of the elongated mass element 4211 to which it is attached. The connecting spring arrangement also comprises a second spring 4432 which is substantially orthogonal to the first spring 4431. The second spring 4432 extends from a spring connection point 44311 on the first spring 4431 to the corresponding Coriolis mass 411. Each connecting spring arrangement further comprises a third spring 4433. One end of the third spring 4433 is connected to a spring anchor point 439 and the other end of the third spring 4433 is connected to the spring connection point 44311 on the first spring 4431 so that the movement of the second spring 4432 in a direction orthogonal to the first spring 4431 (the x-direction in FIG. 4b) is converted into movement of the first spring 4431 in a direction parallel to the first side of the elongated mass element 4211 (the y-direction in FIG. 4b).

The angle of the third spring 4433 in relation to the first spring 4431 and the angle of the third spring 4433 in relation to the second spring 4432 should be given suitable values which facilitate the orthogonal conversion described above. These values depend on the dimensions and geometry of the third spring 4433, but they may for example be in the range 30°-60° at the spring connection point 44311.

In the illustrated connecting spring arrangement, the third spring 4433 comprises a first meandering part which meanders from the spring anchor point 439 in a first spring direction, and a second straight part which extends from the first meandering part to the spring connection point 44311 in a second spring direction which is substantially orthogonal to the first spring direction. In the illustrated case the first meandering part comprises only one turn, but multiple turns could be included. The first spring direction extends in this case away from the spring anchor point 439 substantially at a 45-degree angle in relation to both the lateral and the transversal direction, upward and to the left from said anchor point in FIG. 4b. The second spring direction, on the other hand, is downward and to the left substantially in a 45-degree angle in relation to both the lateral and the transversal direction. The third spring 4433 here meets the first and second springs 4431-4432 at an angle of 45 degrees at the spring connection point 44311.

Alternatively, the third spring could be just a linear spring which extends directly from the spring anchor point to the spring connection point. The spring anchor point would in that case have to be placed further away from the spring connection point. This alternative has not been illustrated.

In both the first and second primary oscillation mode, the second spring 4432 is pushed and pulled back and forth in the lateral direction by the movement of the first Coriolis mass 411. The anchored third spring 4433 prevents the second spring 4432 from undergoing a substantial amount of movement in the lateral direction. The elastic force of the third spring 4433 instead transfers the pushing and pulling force to the first spring 4431, so that the first spring 4431 undergoes movement in the transversal direction. A short and relatively stiff connector spring 4434 transmits the transversal movement of the first spring to the elongated mass element 4211, thereby generating a force which turns the elongated mass element 4211 in the manner which was illustrated in FIGS. 2c and 2d above. The connector spring 4434 may be aligned with the mass element suspender 442, as the figure illustrates.

In the y-axis secondary oscillation mode illustrated in FIG. 2e, the connector spring 4434 and the mass element suspender 442 both undergo torsional twisting. A mass element coupling spring 444 may implemented between the two elongated mass elements 4211 and 4212 to synchronize their movement in the y-axis secondary oscillation mode. This mass element coupling spring may for example be a meandering spring which has enough in-plane flexibility to allow the two elongated mass elements to turn in relation to each other as they rotate in the primary oscillation mode.

The mass element suspender, connecting spring arrangement, connector spring and mass element coupling spring illustrated in FIG. 4b can all be utilized also in the second practical example gyroscope, which will be presented below. They can all be utilized both in gyroscopes which are driven in the first primary oscillation mode and in gyroscopes which are driven in the second primary oscillation mode. However, the central suspension arrangement shown in FIG. 4a is only applicable when the first primary oscillation mode is used.

FIG. 5a illustrates a second practical example. Reference numbers 511, 513, 5211, 5212, 5311, 591 and 592 correspond to reference numbers 211, 213, 2211, 2212, 2311, 291 and 292 respectively, in FIG. 2a. 581 indicates a central anchor point. The other Coriolis masses, elongated mass elements and first peripheral anchor points can be identified from their positioning. The shapes of the Coriolis masses and detection masses in FIG. 5a allows a tightly packed square-shaped configuration. Other shapes and configurations could also be used. The gyroscope illustrated in FIG. 5a can be operated in the second primary oscillation mode.

Reference numbers 595-599 correspond to reference numbers 495-499, respectively, in FIG. 4a. As in the first example, the second end of the elongated mass element 5211 and the outer edge of the third Coriolis mass 513 are aligned on the second lateral axis 595, and all other Coriolis mass/mass element alignments noted with reference to FIG. 4a apply in this case as well.

The first peripheral anchor points such as 5311 are here again located within an opening in the corresponding elongated mass element, in this case 5211. As in the first example, the Coriolis masses comprise openings such as 56. Drive transducers and/or z-axis sense transducers may for example be implemented in these openings.

The central synchronization arrangement comprises four rigid supports 5711 which extend outward from the first central anchor point 581 in the diagonal directions along axes 599. Each rigid support 5711 is connected to a radially flexible first synchronization spring 5712 which flexibly accommodates the simultaneous outward and inward movement of Coriolis masses in the second primary oscillation mode.

Two tangentially flexible but radially stiff second synchronization springs 5713 extend from each first synchronization spring 5712 to each of the adjacent Coriolis masses. The second synchronization springs 5713 flexibly accommodate the simultaneous tangential movement of the Coriolis masses in the second z-axis secondary oscillation mode.

The Coriolis masses are in FIG. 5a supported by an additional intermediate suspension structure. Four diagonal anchor points 538 are placed symmetrically in relation to the first gyroscope center point on the diagonal axes 599. Radial suspenders 551 extend outward from each of these diagonal anchor points 538. Each radial suspender 551 are coupled on the diagonal axes to a corner spring 541 which extends outside of the two adjacent Coriolis masses to their center point on the axis on which they are aligned. For example, corner spring 541 extends from a first attachment point on the first Coriolis mass 511 near axis 591 up to the corner point where it is connected to the end of the radial suspender, and from there rightward to a second attachment point on the third Coriolis mass 513 near axis 592. Each of the other corner springs and radial suspender are connected in the same manner.

The radial suspenders 551 are stiff in the radial direction but flexible in the tangential direction, so they flexibly accommodate the simultaneous tangential movement of Coriolis masses in the second z-axis secondary oscillation mode illustrated in FIG. 2g. Through corner spring 541 they also synchronize simultaneous tangential movement in the Coriolis masses through the same mechanism which was explained above for the action of springs 4431–4433 in FIG. 4b.

More generally, in any embodiment where the second primary oscillation mode shown in FIG. 2d or 3c is used, the central suspension structure may comprise, around each center point, a suspension arrangement which is coupled to each corresponding Coriolis mass and allows them to move simultaneously in radial directions toward and away from the center point. The gyroscope may comprise additional suspension structures which couple the Coriolis masses together for tangential movement in the z-axis secondary oscillation mode.

Figure 5B:
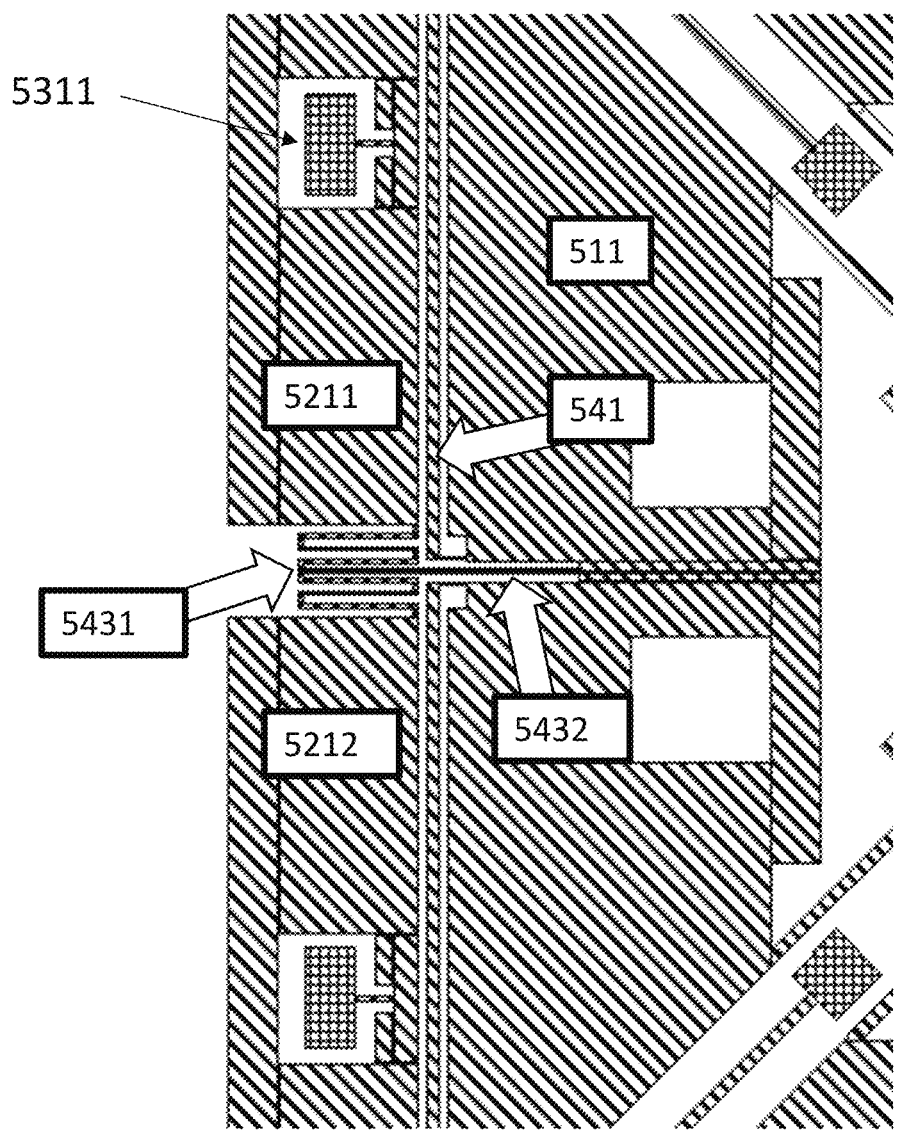

FIG. 5b illustrates in more detail the connecting spring arrangements utilized in FIG. 5a. The mass element suspenders in FIG. 5a are the same as in FIG. 4a, so they will not be described here again.

Each connecting spring arrangement may comprise a first spring which extends between the two corresponding elongated mass elements and a second spring which extends orthogonally to the first spring and from the first spring to the corresponding Coriolis mass. In the example shown in FIG. 5b the first spring is 5431 and the second spring is 5432. In FIG. 5b the first spring is a meandering spring which meanders from one of the said elongated mass elements (5211 and 5212) to the other.

In both the first and second primary oscillation mode, the second spring 5432 is pushed and pulled back and forth in the lateral direction by the movement of the first Coriolis mass 511. The first spring 5431 transfers this movement to the elongated mass elements 5211 and 5212, and they thereby oscillate with the Coriolis mass in the manner which was described with reference to FIG. 2b. The first spring also synchronizes the movement of the two elongated mass elements 5211 and 5212 in the y-axis secondary oscillation mode. The meandering first spring has enough in-plane flexibility allow the elongated mass elements 5211 and 5212 to turn in relation to each other in the primary oscillation mode.

The connecting spring arrangement illustrated in FIG. 5b can be utilized also in the first practical example gyroscope which was presented above. It can be utilized both in gyroscopes which are driven in the first primary oscillation mode and in gyroscopes which are driven in the second primary oscillation mode. However, the central and intermediate suspension arrangements shown in FIG. 5a are only applicable when the second primary oscillation mode is used.

FIG. 6 illustrates a third practical example, which is a two-sided structure with a first Coriolis mass quartet around a first gyroscope center point and a second Coriolis mass quartet around a second gyroscope center point. This idea was presented and discussed with reference to the schematic FIG. 3a. The central and peripheral structures implemented around the first and second Coriolis structures are the same that were presented and discussed with reference to FIGS. 4a-4b, so they will not be discussed again here. The central synchronization arrangements employed in this structure are suitable for the first primary oscillation mode, so the gyroscope illustrated in FIG. 6 can be driven in the first primary oscillation mode which was illustrated in FIG. 3b above.

Reference number 675 in FIG. 6 correspond to reference number 375 in FIGS. 3a and 3b. This lateral synchronization spring 675 extends from the mass element coupling spring of the second pair of elongated mass elements to the mass element coupling spring of the fifth pair of elongated mass elements. The spring 675 may synchronize the movement of the second and fifth pairs in the primary oscillation mode and/or in the y-axis secondary oscillation mode.

The gyroscope also comprises a first additional coupling structure 621 which couples the third pair of elongated mass elements to the seventh pair of elongated mass elements and a second additional coupling structure 622 which couples the fourth pair of elongated mass elements to the eighth pair of elongated mass elements. These additional coupling structures may for example comprise a stiff bar which is suspended from the corresponding additional anchor point (631 and 632, respectively) by a suspension spring which allows the bar to rotate in seesaw movement about the z-axis in the primary oscillation mode and about the y-axis in the x-axis secondary oscillation mode. The additional coupling structures can thereby synchronize the movement of the corresponding mass element pairs in the primary oscillation mode and the x-axis secondary oscillation mode.

The invention claimed is:

1. A microelectromechanical gyroscope comprising a first Coriolis mass quartet which in its rest position lies in a device plane and a corresponding first quartet center point which lies on a first lateral axis in the device plane,
wherein the first Coriolis mass quartet comprises four Coriolis masses which are in their rest positions symmetrically arranged around the first quartet center point where the first lateral axis crosses a first transversal axis orthogonally in the device plane, so that a first and second Coriolis masses in the first Coriolis mass quartet are aligned on the first lateral axis in their rest position, and a third and fourth Coriolis masses in the first Coriolis mass quartet are aligned on a first transversal axis in their rest position,
and the gyroscope further comprises a first central synchronization arrangement centered around the first quartet center point inside the first Coriolis mass quartet,
wherein the gyroscope further comprises a first, second, third and fourth pair of elongated mass elements, wherein the elongated mass elements which form the first pair are transversally aligned on opposite sides of the first lateral axis outside of the first Coriolis mass, and the elongated mass elements which form the second pair are transversally aligned on opposite sides of the first lateral axis outside of the second Coriolis mass, and the elongated mass elements which form the third pair are laterally aligned on opposite sides of the first transversal axis outside of the third Coriolis mass, and the elongated mass elements which form the fourth pair are laterally aligned on opposite sides of the first transversal axis outside of the fourth Coriolis mass,
wherein each elongated mass element in the first, second, third and fourth pairs of elongated mass elements is suspended from a corresponding first peripheral anchor point by a first mass element suspender, and wherein said first mass element suspender extends from said first peripheral anchor point to a fixing point located substantially at the midpoint of said elongated mass element, and each elongated mass element in the first, second, third and fourth pairs of elongated mass elements is attached to a corresponding Coriolis mass of the first Coriolis mass quartet with a connecting spring arrangement,
and the gyroscope further comprises one or more drive transducers for setting the first Coriolis mass quartet and the elongated mass elements into primary oscillating motion where the first and second Coriolis masses in the first Coriolis mass quartet move in anti-phase on the first lateral axis while the third and fourth Coriolis masses in the first Coriolis mass quartet move in anti-phase on the first transversal axis,
and the gyroscope further comprises one or more sense transducers for detecting the secondary oscillating motion of the first Coriolis mass quartet and/or the elongated mass elements.

2. The microelectromechanical gyroscope according to claim 1, wherein the gyroscope further comprises a second Coriolis mass quartet which in its rest position lies in the device plane and a corresponding second quartet center point which lies on the first lateral axis,
wherein the second Coriolis mass quartet comprises four Coriolis masses which are in their rest position symmetrically arranged around the second quartet center point where the first lateral axis crosses a second transversal axis orthogonally in the device plane, so that the first and second Coriolis masses in the second Coriolis mass quartet are aligned on the first lateral axis in their rest position, and the third and fourth Coriolis masses in the second Coriolis mass quartet are aligned on the second transversal axis in their rest position, and the gyroscope further comprises a third transversal axis which crosses the first lateral axis substantially halfway between the first quartet center point and the second quartet center point,
wherein the rest positions of the first, second, third and fourth Coriolis masses in relation to the corresponding quartet center point are the same in both the first and the second quartet, so that the third Coriolis masses in both Coriolis mass quartets are located on a first side of the first lateral axis, and the fourth Coriolis masses in both Coriolis mass quartets are located on a second side of the first lateral axis, and the second Coriolis mass in the first Coriolis mass quartet and the first Coriolis mass in the second Coriolis mass quartet are adjacent to each other on opposing sides of the third transversal axis,
and the gyroscope further comprises a second central synchronization arrangement centred around the second quartet center point inside the second Coriolis mass quartet,
and the gyroscope further comprises a fifth, sixth, seventh and eighth pair of elongated mass elements, wherein the elongated mass elements which form the fifth pair are transversally aligned on opposing sides of the first lateral axis outside of the first Coriolis mass in the second Coriolis mass quartet, and the elongated mass elements which form the sixth pair are transversally aligned on opposing sides of the first lateral axis outside of the second Coriolis mass in the second Coriolis mass quartet, and the elongated mass elements which form the seventh pair are laterally aligned on opposing sides of the second transversal axis outside of the third Coriolis mass in the second Coriolis mass quartet, and the elongated mass elements which form the eighth pair are laterally aligned on opposing sides of the second transversal axis outside of the fourth Coriolis mass in the second Coriolis mass quartet,
wherein each elongated mass element in the fifth, sixth, seventh and eighth pairs of elongated mass elements is suspended from a corresponding second peripheral anchor point by a second mass element suspender, and wherein said second mass element suspender extends from said second peripheral anchor point to a fixing point located substantially at the midpoint of said elongated mass element, and each elongated mass element in the fifth, sixth, seventh and eighth pairs of elongated mass elements is attached to the corresponding Coriolis mass with a connecting spring arrangement,
and the gyroscope also comprises a lateral synchronization spring which couples the second pair of elongated mass elements to the fifth pair of elongated mass elements across the third transversal axis.

3. The microelectromechanical gyroscope according to claim 1,
wherein each connecting spring arrangement comprises a first spring which extends substantially parallel to the first side of the elongated mass element to which it is attached and a second spring which is substantially orthogonal to the first spring, wherein the second spring extends from a spring connection point on the first spring to the corresponding Coriolis mass, and each connecting spring arrangement further comprises a third spring, and one end of the third spring is connected to a spring anchor point and the other end of the third spring is connected to the spring connection point on the first spring so that the movement of the second spring in a direction orthogonal to the first spring is converted into movement of the first spring in a direction parallel to the first side of the elongated mass element.

4. The microelectromechanical gyroscope according to claim 3, wherein the third spring comprises a first meandering part which meanders from the spring anchor point in a first spring direction, and a second straight part which extends from the first meandering part to the spring connection point in a second spring direction which is substantially orthogonal to the first spring direction.

5. The microelectromechanical gyroscope according to claim 1, wherein each connecting spring arrangement comprises a first spring which extends between the two corresponding elongated mass elements and a second spring which extends orthogonally to the first spring and from the first spring to the corresponding Coriolis mass.

6. The microelectromechanical gyroscope according to claim 5, wherein each first spring is a meandering spring which meanders from one of the said elongated mass elements to the other.

* * * * *